(12) United States Patent
Tokoro

(10) Patent No.: US 6,548,771 B1
(45) Date of Patent: Apr. 15, 2003

(54) MULTIPOLE ATTITUDE DETECTOR SWITCH WITH LIQUID CONTACT

(75) Inventor: Takeshi Tokoro, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/806,760

(22) PCT Filed: Aug. 12, 1999

(86) PCT No.: PCT/JP99/04379

§ 371 (c)(1), (2), (4) Date: Jun. 4, 2001

(87) PCT Pub. No.: WO01/13058

PCT Pub. Date: Feb. 22, 2001

(51) Int. Cl.[7] .................. H01H 35/02; H01H 29/22; H01H 35/14

(52) U.S. Cl. .................. 200/61.47; 200/188; 200/220; 200/224

(58) Field of Search .................. 200/61.47, 61.52, 200/182–236

(56) References Cited

U.S. PATENT DOCUMENTS

| | | | | |
|---|---|---|---|---|
| 3,161,738 A | * | 12/1964 | Hall .................. | 200/188 X |
| 3,450,408 A | * | 6/1969 | Hagerman .............. | 200/221 X |
| 3,786,472 A | * | 1/1974 | Scopacasa ............. | 200/224 X |
| 3,914,567 A | * | 10/1975 | Reinnagel ............. | 200/61.47 |
| 4,138,600 A | * | 2/1979 | Ozols ................. | 102/61.47 |
| 4,312,227 A | * | 1/1982 | Ozols ................. | 200/61.47 X |
| 4,425,488 A | * | 1/1984 | Moskin et al. ......... | 200/220 |
| 4,490,625 A | * | 12/1984 | Dilly ................. | 200/61.52 |
| 4,528,851 A | * | 7/1985 | Ozols ................. | 200/61.47 X |
| 4,652,710 A | * | 3/1987 | Karnowsky et al. ..... | 200/182 X |
| 4,920,330 A | * | 4/1990 | Plozner .............. | 200/61.47 X |

FOREIGN PATENT DOCUMENTS

| | | | |
|---|---|---|---|
| EP | 1202026 A1 | * | 5/2002 |
| JP | 58-159726 A | * | 9/1983 |
| JP | 61-79117 A | * | 4/1986 |
| JP | 63-120214 A | * | 5/1988 |
| JP | 6-307805 A | * | 11/1994 |

* cited by examiner

Primary Examiner—J. R. Scott
(74) Attorney, Agent, or Firm—Adams & Wilks

(57) ABSTRACT

An attitude detection device has a case having inner surfaces, electrodes each disposed on a respective inner surface of the case and being insulated from one another in at least one preselected orientation of the case, and a conductive fluid disposed in the case. In a first orientation of the case, the conductive fluid electrically connects all but one of the electrodes to generate a first electrical pattern for outputting a first output signal. In a second orientation of the case, the conductive fluid electrically connects all but three of the electrodes to generate a second electrical pattern for outputting a second output signal. In a third orientation of the case different from the first and second orientations, a third electrical pattern is generated for outputting a third output signal.

17 Claims, 30 Drawing Sheets

* ORIGIN G TAKE AS A CUBE CENTER OF GRAVITY

FIG. 15

| | A1 | A2 | A3 | A4 | A5 | A6 | POSITION | RESISTANCE (RATIO) |
|---|---|---|---|---|---|---|---|---|
| 1 | OFF | ON | ON | ON | ON | ON | $-7 \leq \alpha \leq 7°$ AND $-7 \leq \beta \leq 7°$ (HORIZONTAL) | 1 |
| 2 | ON | OFF | ON | ON | ON | ON | $-7 \leq \alpha \leq 7°$ AND $83 \leq \beta \leq 97°$ (9 U) | 3.48 |
| 3 | ON | ON | OFF | ON | ON | ON | $83 \leq \alpha \leq 97°$ AND $-7 \leq \beta \leq 7°$ (12 U) | 3.48 |
| 4 | ON | ON | ON | OFF | ON | ON | $-7 \leq \alpha \leq 7°$ AND $-83 \leq \beta \leq -97°$ (3 U) | 3.48 |
| 5 | ON | ON | ON | ON | OFF | ON | $-83 \leq \alpha \leq -97°$ AND $-7 \leq \beta \leq 7°$ (6 U) | 3.48 |
| 6 | ON | ON | ON | ON | ON | OFF | $173 \leq \alpha \leq 187°$ AND $-7 \leq \beta \leq 7°$ (BACK HORIZONTAL) | 1 |
| 7 | OFF | ON | ON | ON | OFF | ON | $-7 \leq \alpha \leq -83°$ AND $-7 \leq \beta \leq 7°$ | 1.83 |
| 8 | OFF | ON | ON | ON | ON | ON | $7 \leq \alpha \leq 83°$ AND $-7 \leq \beta \leq 7°$ | 1.83 |
| 9 | OFF | ON | OFF | ON | ON | ON | $-7 \leq \alpha \leq 7°$ AND $7 \leq \beta \leq 83°$ | 1.83 |
| 10 | OFF | ON | ON | OFF | ON | ON | $-7 \leq \alpha \leq 7°$ AND $-7 \leq \beta \leq -83°$ | 1.83 |
| 11 | ON | OFF | ON | ON | OFF | ON | $7 \leq \alpha \leq 83°$ AND $83 \leq \beta \leq 97°$ | 1.83 |
| 12 | ON | OFF | ON | ON | ON | ON | $-7 \leq \alpha \leq -83°$ AND $83 \leq \beta \leq 97°$ | 1.83 |
| 13 | ON | OFF | OFF | ON | ON | ON | $-7 \leq \alpha \leq 7°$ AND $97 \leq \beta \leq 173°$ | 1.83 |
| 14 | ON | OFF | ON | OFF | ON | ON | $-7 \leq \alpha \leq 7°$ AND $-7 \leq \beta \leq -83°$ | 1.83 |
| 15 | ON | ON | OFF | ON | OFF | ON | $83 \leq \alpha \leq 97°$ AND $7 \leq \beta \leq 83°$ | 1.83 |
| 16 | ON | ON | OFF | ON | ON | ON | $97 \leq \alpha \leq 173°$ AND $-7 \leq \beta \leq 7°$ | 1.83 |
| 17 | ON | ON | OFF | OFF | ON | ON | $83 \leq \alpha \leq 97°$ AND $-83 \leq \beta \leq -97°$ | 1.83 |
| 18 | ON | ON | OFF | ON | ON | OFF | $-7 \leq \alpha \leq 7°$ AND $-97 \leq \beta \leq -173°$ | 1.83 |
| 19 | OFF | ON | ON | OFF | OFF | ON | $-7 \leq \alpha \leq -83°$ AND $-7 \leq \beta \leq 7°$ | 3.48 |
| 20 | ON | OFF | ON | OFF | OFF | ON | $-97 \leq \alpha \leq -173°$ AND $-7 \leq \beta \leq 7°$ | 3.48 |
| 21 | OFF | ON | ON | OFF | ON | OFF | $-7 \leq \alpha \leq -83°$ AND $-7 \leq \beta \leq -83°$ | 3.48 |
| 22 | ON | OFF | ON | OFF | ON | OFF | $-7 \leq \alpha \leq 7°$ AND $-97 \leq \beta \leq -173°$ | 3.48 |
| 23 | ON | OFF | OFF | ON | OFF | ON | $97 \leq \alpha \leq 173°$ AND $7 \leq \beta \leq 83°$ | 3.48 |
| 24 | ON | ON | OFF | ON | OFF | OFF | $97 \leq \alpha \leq 173°$ AND $-7 \leq \beta \leq 7°$ | 3.48 |
| 25 | OFF | ON | OFF | ON | ON | ON | $7 \leq \alpha \leq 83°$ AND $7 \leq \beta \leq 83°$ | 3.48 |
| 26 | OFF | OFF | OFF | ON | ON | ON | $7 \leq \alpha \leq 83°$ AND $7 \leq \beta \leq 83°$ | 3.48 |

* ROTATION ANGLE ABOUT X AXIS IS TAKEN $\alpha$ AND ROTATION ANGLE ABOUT Y AXIS IS $\beta$.
* Z-AXIS ROTATION ANGLE IN EACH ITEM IS ARBITRARY.

* ORIGIN G TAKEN AS A CUBE CENTER OF GRAVITY

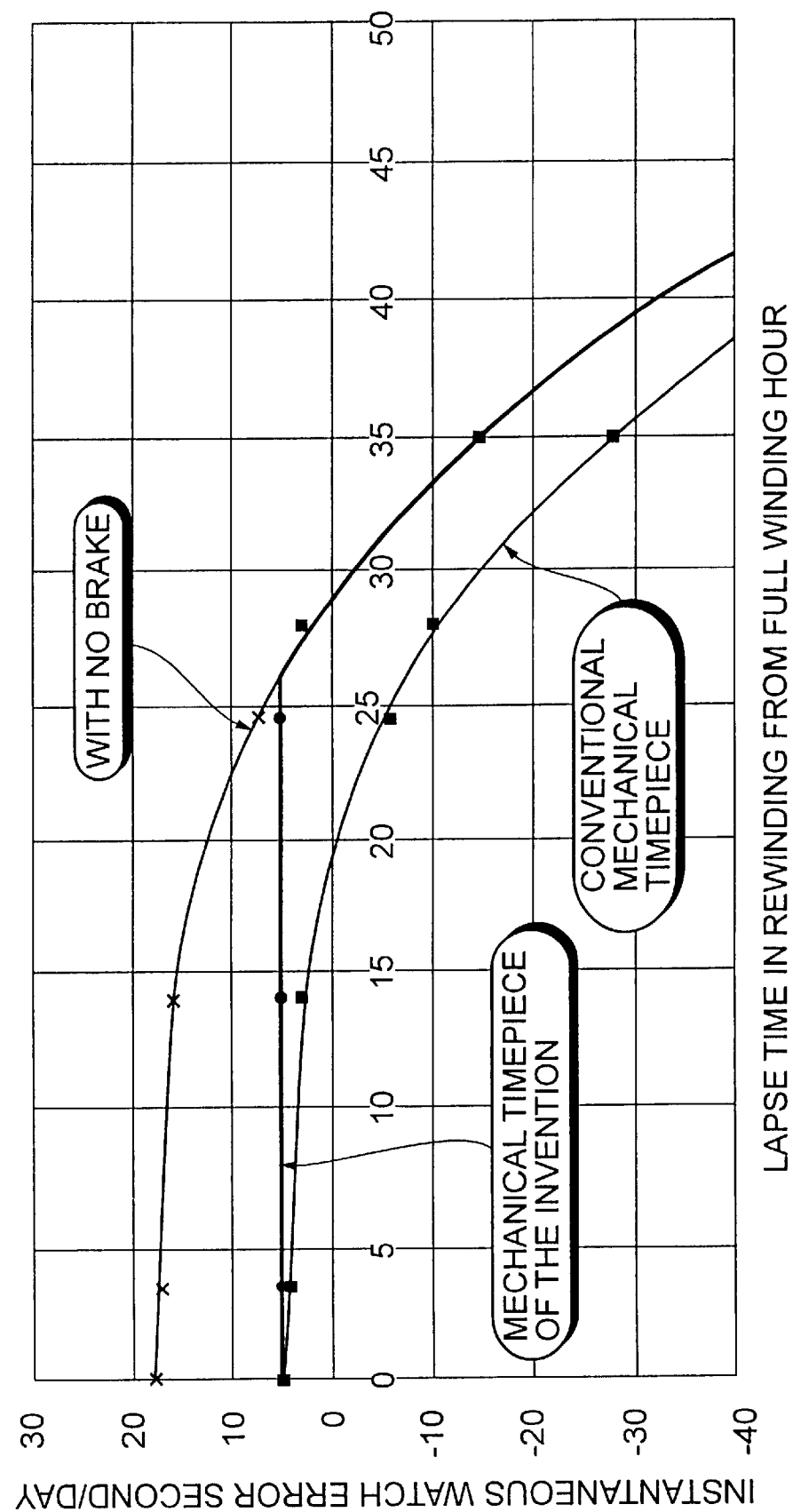

FIG.28

| | A11 | A12 | A13 | A14 | A21 | A22 | A23 | A24 | A31 | A32 | A33 | A34 | A41 | A42 | A43 | A44 | A51 | A52 | A53 | A54 | A61 | A62 | A63 | A64 |
|---|---|---|---|---|---|---|---|---|---|---|---|---|---|---|---|---|---|---|---|---|---|---|---|---|
| 1 | OFF | OFF | OFF | OFF | OFF | OFF | OFF | ON | OFF | OFF | OFF | ON | OFF | OFF | ON | OFF | OFF | ON | OFF | ON | ON | ON | ON | ON |
| 2 | OFF | OFF | OFF | OFF | OFF | OFF | ON | OFF | OFF | OFF | ON | OFF | OFF | ON | OFF | OFF | ON | OFF | OFF | OFF | ON | ON | OFF | OFF |
| 3 | OFF | OFF | OFF | OFF | OFF | OFF | OFF | ON | OFF | OFF | ON | OFF | OFF | OFF | OFF | ON | OFF | ON | OFF | OFF | ON | OFF | OFF | OFF |

| | ATTITUDE | RESISTANCE (RATIO) |
|---|---|---|
| 1 | $-2.5 \leq \alpha \leq 2.5°$ AND $-2.5 \leq \beta \leq 2.5°$ | 1 |
| 2 | $-4.5 \leq \alpha \leq 85.5°$ AND $-14 \leq \beta \leq 14°$ | 1.83 |
| 3 | $\alpha = 45°$ AND $\beta = 45°$ | 3.48 |

\* ROTATION ANGLE ABOUT X AXIS IS TAKEN AS $\alpha$ AND ROTATION ANGLE ABOUT Y AXIS AS $\beta$.

\* ROTATION ANGLE ABOUT Z AXIS IS ARBITRARY FOR EACH ITEM.

MULTIPOLE ATTITUDE DETECTOR SWITCH WITH LIQUID CONTACT

CROSS-REFERENCE TO RELATED APPLICATIONS

This application is a U.S. national state application of copending International Application Ser. No. PCT/JP99/04379 filed Aug. 12, 1999 and published in a non-English language.

BACKGROUND OF THE INVENTION

The present invention relates to an attitude detection device capable of detecting with high precision an attitude of a machine or equipment in which it is used.

BACKGROUND INFORMATION

Conventional Attitude Detection Device

A conventional attitude detection device disclosed in JP-A-6-307805, for example, has a hollow outer spherical body and an inner spherical body rigidly secured in a hollow portion of the outer spherical body with a predetermined layer space therebetween, wherein a fluid conductor is arranged between a first conductive area including an electrode formed over the entire inner side of the outer spherical body and a second conductive area including a plurality of electrodes formed in a dotted pattern on the outer side of the inner spherical body. In this conventional attitude detection device, the fluid conductor can move in the layer space between the first conductive area and the second conductive area to bring one of the electrodes in the second conductive area into electrical contact with the electrode of the first conductive area to detect the attitude of the equipment.

Mainspring Torque and Deflection Angle of Balance in Conventional Mechanical Watch Generally, conventional mechanical watches do not have an attitude detection device. In such a conventional typical mechanical watch, as shown in FIG. 30, the mainspring torque decreases as the spring unwinds from a completely wound state (fully wound state) with the elapse of the operating time. In the case of FIG. 30, for example, the mainspring torque is about 27 g.cm in a fully wound state. The mainspring torque decreases to about 23 g.cm 20 hours after the mainspring is fully wound, and further to about 18 g.cm 40 hours from the fully wound state.

Generally, in a conventional typical mechanical watch, as shown in FIG. 31, as the mainspring torque decreases, the deflection angle of the balance also decreases. For example, in the case of FIG. 31, when the mainspring torque is 25 g.cm,–28 g.cm, the deflection angle of the balance is about 240–270 degrees; and when the mainspring torque is 20 g.cm–25 g.cm, the deflection angle of the balance is about 180–240 degrees.

Instantaneous Watch Error of Conventional Mechanical Watch

FIG. 32 shows a tradition of an instantaneous watch error (value representing the accuracy of a watch) as related to the deflection angle of the balance in a conventional typical mechanical watch. Here, the "instantaneous watch error" refers to a "value representing an amount gained or lost by a mechanical watch per day by assuming that the mechanical watch has been left to stand for one day while maintaining the state and environment, such as the deflection angle of the balance, as they were when the watch error was measured." In the case shown in FIG. 32, when the deflection angle of the balance is 240 degrees or more, or 200 degrees or less, the instantaneous watch error loses.

For example, in the conventional typical mechanical watch, when the deflection angle of the balance is about 200–240 degrees, the instantaneous watch error is about 0–5 seconds/day (it gains about 0–5 seconds a day). When the deflection angle of the balance is approximately 170 degrees, the instantaneous watch error is approximately –20 seconds/day (it loses about 20 seconds a day).

FIG. 27 shows a transition over time of the instantaneous watch error in a conventional typical mechanical watch as the spring unwinds from the fully wound state. In the conventional mechanical watch, the "watch error" indicating the amount gained or lost by the watch per day is obtained by integrating over 24 hours the instantaneous watch error indicated by a thick line in FIG. 27 which is related to the time it takes for the spring to unwind from the fully wound state.

Generally, in the conventional mechanical watch, as the spring unwinds from the fully wound state with the elapse of the operating time, the mainspring torque decreases and the deflection angle of the balance also decreases, which in turn causes the instantaneous watch error to lose. Hence, in the prior art mechanical watch, it is a conventional practice that, to allow for the slowdown that will occur 24 hours of the operating time later, the instantaneous watch error when the spring is fully wound is advanced beforehand such that the "watch error" indicating the amount gained or lost by the watch in one day will be positive.

For example, in the conventional typical mechanical watch, as shown by a thick line in FIG. 27, the instantaneous watch error is about 5 seconds/day (the watch gains about 5 seconds a day) in a fully wound state. But the instantaneous watch error decreases to about –1 second/day (the watch loses about 1 second a day) 20 hours after the mainspring is fully wound, and further to –5 seconds/day (it loses about 5 seconds a day) 24 hours from the fully wound state. When 30 hours pass from the fully wound state, the instantaneous watch error becomes approximately –15 seconds/day (the watch loses about 15 seconds a day).

Attitude and Instantaneous Watch Error of Conventional Mechanical Watch

Further, in a conventional typical mechanical watch, the instantaneous watch error when the watch is in a "horizontal attitude" and in a "inverted horizontal attitude" is faster than the instantaneous watch error when it is in a "vertical attitude."

For example, when a conventional typical mechanical watch is in a "horizontal attitude" and in an "inverted horizontal attitude", although the instantaneous watch error in the fully wound state is about 8 seconds/day (the watch gains about 8 seconds a day), as indicated by a thick line in FIG. 33, the instantaneous watch error decreases to about 3 seconds/day (it gains about 3 seconds a day) 20 hours from the fully wound state, to about –2 seconds/day (it loses about 2 seconds a day) 24 hours from the fully wound state, and to about –12 seconds/day (it loses about 12 seconds a day) 30 hours from the fully wound state.

In the "vertical attitude", on the other hand, the conventional typical mechanical watch has the instantaneous watch error of about 3 seconds/day (the watch gains about 3 seconds a day) in a fully wound state, as indicated by a thin line in FIG. 33. The instantaneous watch error, however, decreases to about −2 seconds/day (the watch gains about 2 seconds a day) 20 hours after the mainspring is fully wound, to about −7 seconds/day (it loses about 7 seconds a day) 24 hours from the fully wound state, and further to about −17 seconds/day (it loses about 17 seconds a day) 30 hours from the fully wound state.

OBJECT OF THE INVENTION

It is an object of the present invention to provide an attitude detection device capable of detecting with high precision an attitude of a machine or equipment in which it is used.

It is another object of the present invention to provide a small attitude detection device with high precision that can be used in small precision devices such as mechanical watches.

SUMMARY OF THE INVENTION

The present invention is characterized by the attitude detection device which comprises: a case having a hexahedral shape; electrodes arranged one on each inner surface of the case; and a conductive fluid accommodated in the case; wherein the electrodes are insulated from one another.

In the attitude detection device of the invention, it is preferred that the conductive fluid be arranged to assume a state in which it contacts five of the electrodes, a state in which it contacts four of the electrodes, and a state in which it contacts three of the electrodes.

In the attitude detection device of the invention, it is preferred that the electrodes be almost square in shape and their shapes be almost identical.

In another embodiment, the present invention is characterized by an attitude detection device which comprises: a case having a hexahedral shape; electrodes arranged two or more on each inner surface of the case; and a conductive fluid accommodated in the case; wherein the electrodes are insulated from one another.

The present invention is characterized by the attitude detection device which comprises: a case having a hexahedral shape; electrodes arranged two or more on each inner surface of the case; and a conductive fluid accommodated in the case; wherein the electrodes are insulated from one another.

BRIEF DESCRIPTION OF THE DRAWINGS

FIG. 15 is a table showing the relation, in the mechanical watch having the first embodiment of the attitude detection device of the invention, between the attitude in which the mechanical watch is arranged, the conduction state of each electrode pattern of the attitude detection device of the invention, and an electric resistance provided in a circuit block of the mechanical watch.

FIG. 27 is a graph schematically showing a relation between an instantaneous watch error and an elapsed time from a fully wound state of a spring in a mechanical watch having the attitude detection device of the invention and in a conventional mechanical watch.

FIG. 28 is a table showing the relation, in the mechanical watch having the second embodiment of the attitude detection device of the invention, between the attitude in which the mechanical watch is arranged, the conduction state of each electrode pattern of the attitude detection device of the invention, and an electric resistance provided in a circuit block of the mechanical watch.

DETAILED DESCRIPTION OF THE PREFERRED EMBODIMENTS

Now, embodiments of the attitude detection device of this invention will be described by referring to the accompanying drawings.

(1) First Embodiment of Attitude Detection Device of the Invention

Next, the construction of the first embodiment of the attitude detection device of the invention will be explained.

Figure 6:
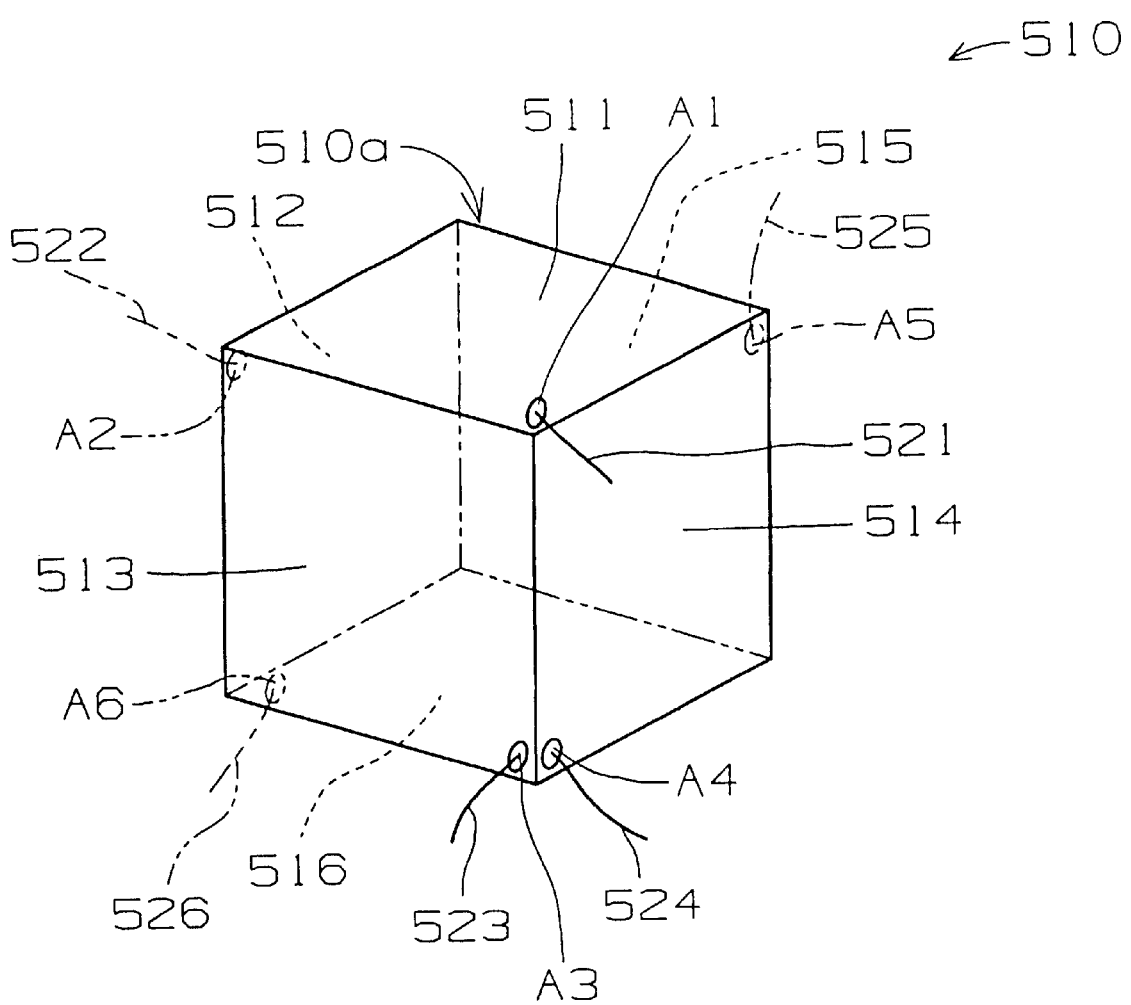
FIG. 6 is an enlarged perspective view showing an outline construction of a first embodiment of the attitude detection device of the invention.
Figure 7:
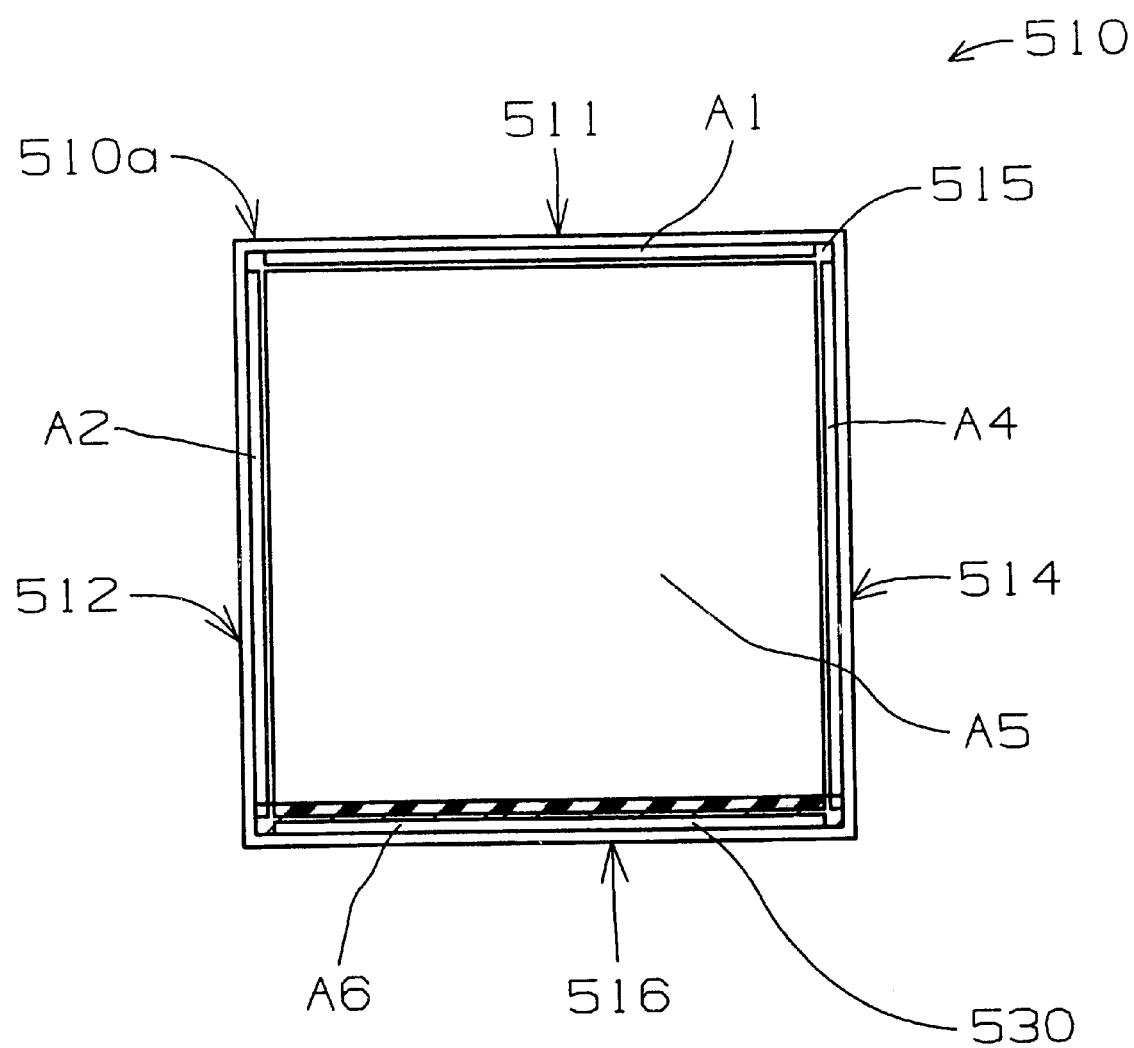
FIG. 7 is an enlarged cross section view showing an outline construction of a first embodiment of the attitude detection device of the invention.
Figure 8:
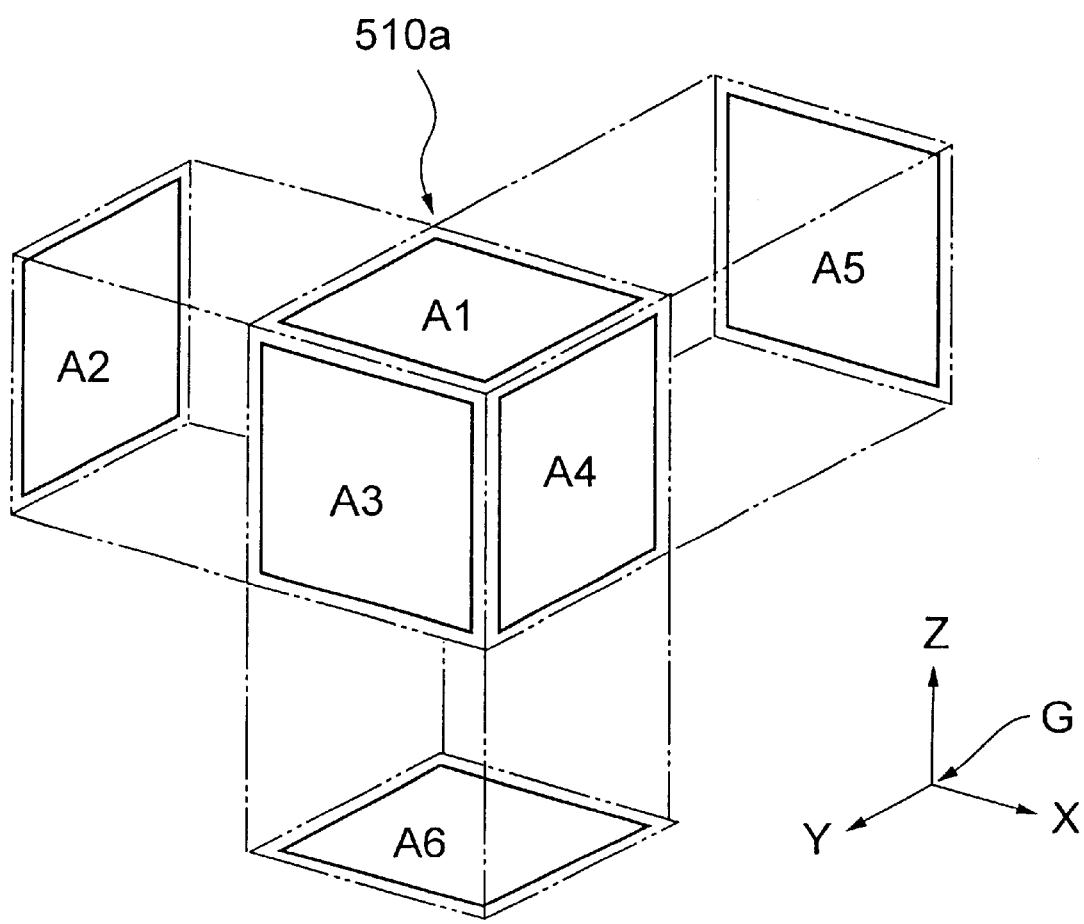
FIG. 8 is an enlarged perspective view showing an outline construction of electrode patterns in the first embodiment of the attitude detection device of the invention (In FIG. 8 a case 510a is indicated by two-dotted chain line, with lines representing the thickness of each electrode omitted).

Referring to FIGS. 6 to 8, the attitude detection device 510 has an almost cubicle-shaped case 510a. The case 510a includes a top wall 511, four side walls 512, 513, 514, 515, and a bottom wall 516.

The case of the attitude detection device of this invention is preferably shaped almost cubicle, but it may have other hexahedral shapes such as rectangular parallelepiped.

The case 510a is formed of plastics such as polyimide, glass epoxy boards and insulating materials such as quartz.

In the case 510a, the top wall 511 crosses each of the side walls 512, 513, 514, 515 perpendicularly.

The bottom wall 516 crosses each of the side walls 512, 513, 514, 515 perpendicularly.

The side wall 512 crosses the side wall 513 and the side wall 515 perpendicularly.

The side wall 514 crosses the side wall 513 and the side wall 515 perpendicularly.

Referring to FIG. 8, an electrode A1 is provided over almost the entire inner surface of the top wall 511. An electrode A2 is formed over almost the entire inner surface of the side wall 512. An electrode A3 is provided over almost the entire inner surface of the side wall 513. An electrode A4 is provided over almost the entire inner surface of the side wall 514. An electrode A5 is provided over almost the entire inner surface of the side wall 515. An electrode A6 is provided over almost the entire inner surface of the bottom wall 516.

Although in FIG. 8 the electrode A2, the electrode A5 and the electrode A6 are shown taken apart from the case 510a to facilitate the explanation, the electrodes A1, A2, A3, A4, A5 and A6 are arranged to form virtually a cube. These electrodes A1, A2, A3, A4, A5, A6 are arranged with a space therebetween. That is, the electrodes A1, A2, A3, A4, A5, A6 are insulated from one another.

The electrodes A1–A6 are preferably shaped almost square. It is also preferred that the shapes of these electrodes A1–A6 be formed nearly equal to one another.

In FIG. 8, a gravity center G of the cube of the case 510a is defined as an origin of a coordinate system. An X axis is defined as a direction perpendicular to the electrode A4. The positive direction of the X axis is defined as a direction extending perpendicular to the electrode A4 from the gravity center G toward the outside of the case 510a.

A Y axis is defined as a direction perpendicular to the electrode A3. The positive direction of the Y axis is defined as a direction extending perpendicular to the electrode A3 from the gravity center G toward the outside of the case 510a.

A Z axis is defined as a direction perpendicular to the electrode A1. The positive direction of the Z axis is defined as a direction extending perpendicular to the electrode A1 from the gravity center G toward the outside of the case 510a.

Referring to FIG. 6, an electrode lead wire 521 is connected to the electrode A1. A electrode lead wire 522 is connected to the electrode A2. An electrode lead wire 523 is connected to the electrode A3. An electrode lead wire 524 is connected to the electrode A4. An electrode lead wire 525 is connected to the electrode A5. An electrode lead wire 526 is connected to the electrode A6.

Referring to FIG. 7, a conductive fluid 530 is accommodated in the case 510a. The conductive fluid 530 is mercury, for example. The volume of the conductive fluid 530 is, in the case of FIG. 7, 1/48 that of the case 510a but should preferably be 1/6 to 1/48 the volume of the case 510a.

In the state of FIG. 7, the conductive fluid 530 is in contact with the electrode A2, the electrode A3, the electrode A4, the electrode A5 and the electrode A6, but is out of contact with the electrode A1. Hence, in the state of FIG. 7 the electrode A2, the electrode A3, the electrode A4, the electrode A5 and the electrode A6 are shorted by the conductive fluid 530 (that is, they are electrically connected to one another).

(2) Terminologies for Mechanical Watch

Next, terminologies in the mechanical watch will be explained.

Generally, a side of the main plate on which a dial is mounted is referred to as a "back side" of the movement and another side opposite the dial side is referred to as a "front side" of the movement. A wheel train assembled on the "front side" of the movement is called a "front wheel train" and a wheel train assembled on the "back side" of the movement is called a "back wheel train".

A state in which the dial side of the main plate faces upward is called an "inverted horizontal attitude" and a state in which the dial side faces downward is called a "horizontal attitude".

Further, a state in which the dial is disposed vertically is called a "vertical attitude"; a state in which a 12-hour marking on the dial is disposed vertically upward is called a "12-hour up (12U) attitude"; a state in which a 3-hour marking on the dial is disposed vertically upward is called a "3-hour up (3U) attitude"; a state in which a 6-hour marking on the dial is disposed vertically upward is called a "6-hour up (6U) attitude"; and a state in which a 9-hour marking on the dial is disposed vertically upward is called a "9-hour up (9U) attitude."

(3) Train Wheel, Escapement/Governor, and Selector

Figure 1:
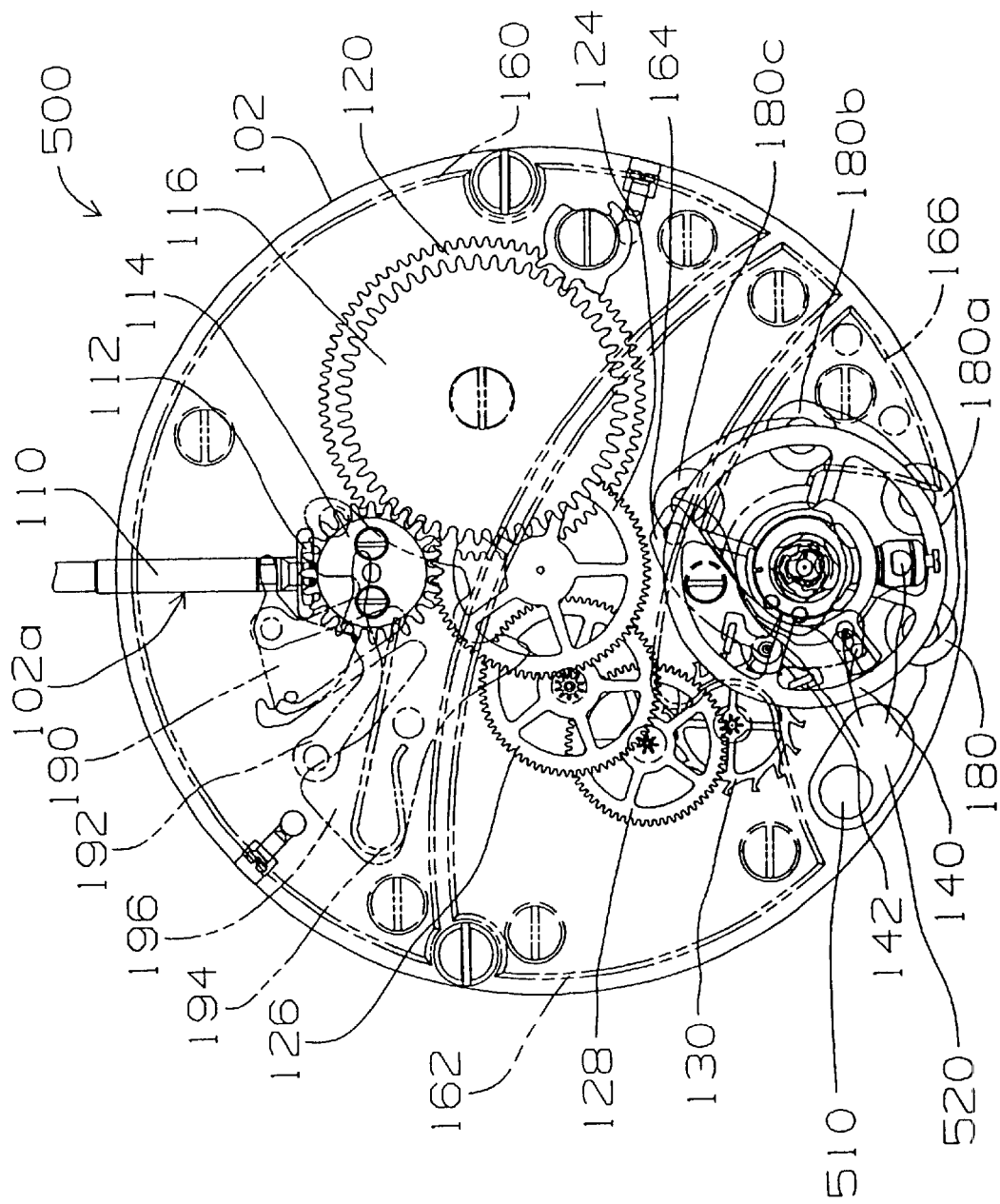
FIG. 1 is a plan view showing an outline construction of the front side of a movement of a mechanical watch having the attitude detection device of the invention (In FIG. 1 a part of the components is omitted and support members are indicated by imaginary lines).
Figure 2:
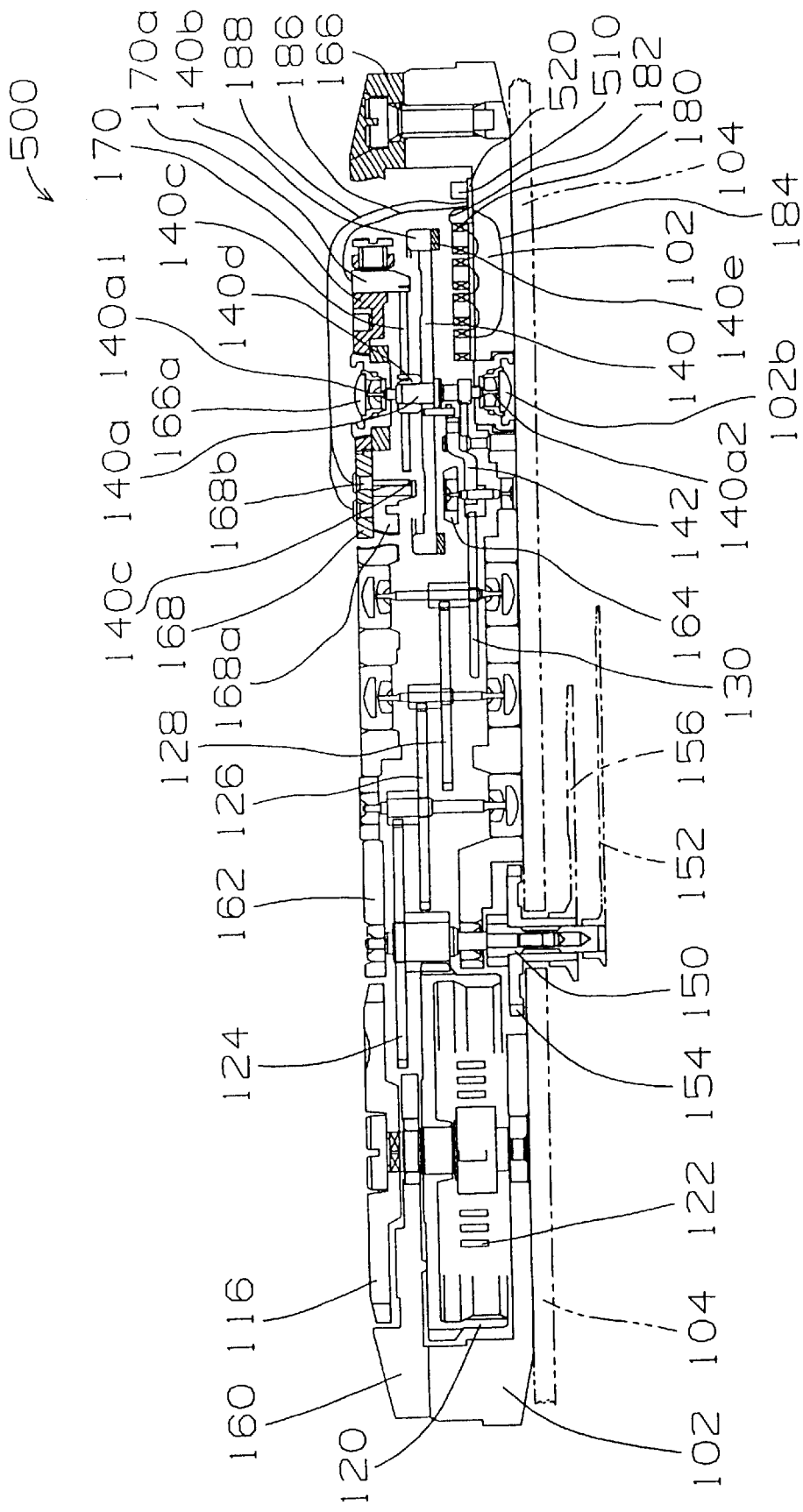
FIG. 2 is an outline partial cross section of the movement of the mechanical watch having the attitude detection device of the invention (In FIG. 2 a part of the components is omitted).

Referring to FIGS. 1 and 2, in the mechanical watch having the attitude detection device of this invention, a movement (moving mechanism) 500 of the mechanical watch has a main plate 102 that forms a base plate of the movement. A hand setting stem 110 is rotatably fitted in a stem guide hole 102a of the main plate 102. A dial 104 (shown by an imaginary line in FIG. 2) is mounted to the movement 500.

The hand setting stem 110 has an angled portion and a guide shank. A clutch wheel (not shown) is fitted over the angled portion of the hand setting stem 110. The clutch wheel has the same rotation axis as the hand setting stem 110. That is, the clutch wheel has an angled hole, which is fitted over the angled portion of the hand setting stem 110 so that the clutch wheel is rotated as the hand setting stem 110 turns. The clutch wheel has a first gear and a second gear, the first gear being provided at one end of the clutch wheel near the center of the movement, the second wheel at the other end of the clutch wheel near the outer side of the movement.

The movement 500 has a switching device for determining the position of the axis direction of the hand setting stem 110. The switching device includes a setting lever 190, a yoke 192, a yoke spring 194, and a setting lever jumper 196. According to the rotation of the setting lever, the axial position of the hand setting stem 110 is determined. Based on the rotation of the yoke, the axial position of the clutch wheel is determined. Based on the rotation of the setting lever, the yoke is positioned at two rotary positions.

A winding pinion 112 is rotatably mounted on the guide shank of the hand setting stem 110. When the hand setting stem 110 is rotated when it is located at a first stem position (0th stage) nearest the inner side of the movement along its rotation axis direction, the winding pinion 112 is rotated through the clutch wheel. A crown wheel 114 is rotated by the rotation of the winding pinion 112. A ratchet wheel 116 is rotated by the rotation of the crown wheel 114.

The movement 500 is driven by a coiled mainspring 122 accommodated in a barrel 120. The mainspring 122 is made of an elastic material having a spring characteristic such as iron. The mainspring 122 can be wound up by rotating the ratchet wheel 116.

A center wheel & pinion 124 is rotated by the rotation of the barrel 120. A third wheel & pinion 126 is rotated by the rotation of the center wheel & pinion 124. A fourth wheel & pinion 128 is rotated by the rotation of the third wheel & pinion 126. A escape wheel & pinion 130 is rotated by the rotation of the fourth wheel & pinion 128. The barrel 120, the center wheel & pinion 124, the third wheel & pinion 126, and the fourth wheel & pinion 128 forms a front train.

The movement 500 has an escapement/governor for controlling the rotation of the front train. The escapement/governor includes a balance 140 which repeats left and right rotations in a predetermined cycle, an escape wheel & pinion 130 that is rotated by the rotation of the front train, and a pallet 142 that controls the rotation of the escape wheel & pinion 130 according to the operation of the balance 140.

The balance 140 includes a balance staff 140a, a balance wheel 140b, and a hairspring 140c. The hairspring 140c is made of an elastic material having a spring characteristic, such as "elinvar." That is, the hairspring 140c is made of a conductive metallic material.

As the center wheel & pinion 124 rotates, a cannon pinion 150 also rotates at the same time. A minute hand 152 mounted to the cannon pinion 150 is arranged to indicate "minutes." The cannon pinion 150 is provided with a slip mechanism that has a predetermined slip torque with respect to the center wheel & pinion 124.

As the cannon pinion 150 rotates, a minute wheel (not shown) is rotated. As the minute wheel rotates, an hour wheel rotates. An hour hand 156 is arranged to indicate "hours."

The barrel 120 is supported rotatable with respect to the main plate 102 and a barrel bridge 160. The center wheel & pinion 124, the third wheel & pinion 126, the fourth wheel & pinion 128 and the escape wheel & pinion 130 are supported so that they can rotate relative to the main plate 102 and the train wheel bridge 162. The pallet 142 is supported so as to be rotatable relative to the main plate 102 and a pallet bridge 142.

The balance 140 is supported so as to be rotatable relative to the main plate 102 and a balance bridge 166. That is, an upper tenon 140a1 of the balance staff 140a is supported rotatable by a balance upper bush 166a secured to the balance bridge 166. The balance upper bush 166a includes a balance upper hole jewel and a balance upper cap jewel. The balance upper hole jewel and the balance upper cap jewel are made of an insulating material such as ruby.

A lower tenon 140a2 of the balance staff 140a is supported rotatable by a balance lower bush 102b secured to the main plate 102. The balance lower bush 102b includes a balance lower hole jewel and a balance lower cap jewel. The balance lower hole jewel and the balance lower cap jewel are made of an insulating material such as ruby.

The hairspring 140c is a spiral thin leaf spring coiled in a plurality of turns. The inner end of the hairspring 140c is fixed to a hairspring holder 140d secured to the balance staff 140a and the outer end of the hairspring 140c is secured by a screw to a stud 170a mounted on a stud support 170 rotatably secured to the balance bridge 166. The balance bridge 166 is made of a conductive metal such as brass.

(4) Switch Mechanism of Mechanical Watch Having Attitude Detection Device of the Invention Next, the switch mechanism of the mechanical watch having the attitude detection device of this invention will be explained.

Referring to FIGS. 1 to 4, a switch lever 168 is rotatably mounted on the balance bridge 166. A first contact member 168a and a second contact member 168b are provided to the switch lever 168. The switch lever 168 is attached to the balance bridge 166 so that it is rotatable about the rotating center of the balance 140. The switch lever 168 is made of a plastic insulating material such as polycarbonate. The first contact member 168a and the second contact member 168b are made of a conductive metal such as brass. A portion of the hairspring 140c near its outer end is situated between the first contact member 168a and the second contact member 168b.

Coils 180, 180a, 180b, 180c mounted on the front surface of the main plate 102 so that they face the main plate side of the balance wheel 140b. The number of coils is four, for example, as shown in FIG. 1 and but may also be 1, 2, or 3.

A balance magnet 140e is attached to the main plate side of the balance wheel 140b so that it faces the front side of the main plate 102.

Figure 3:
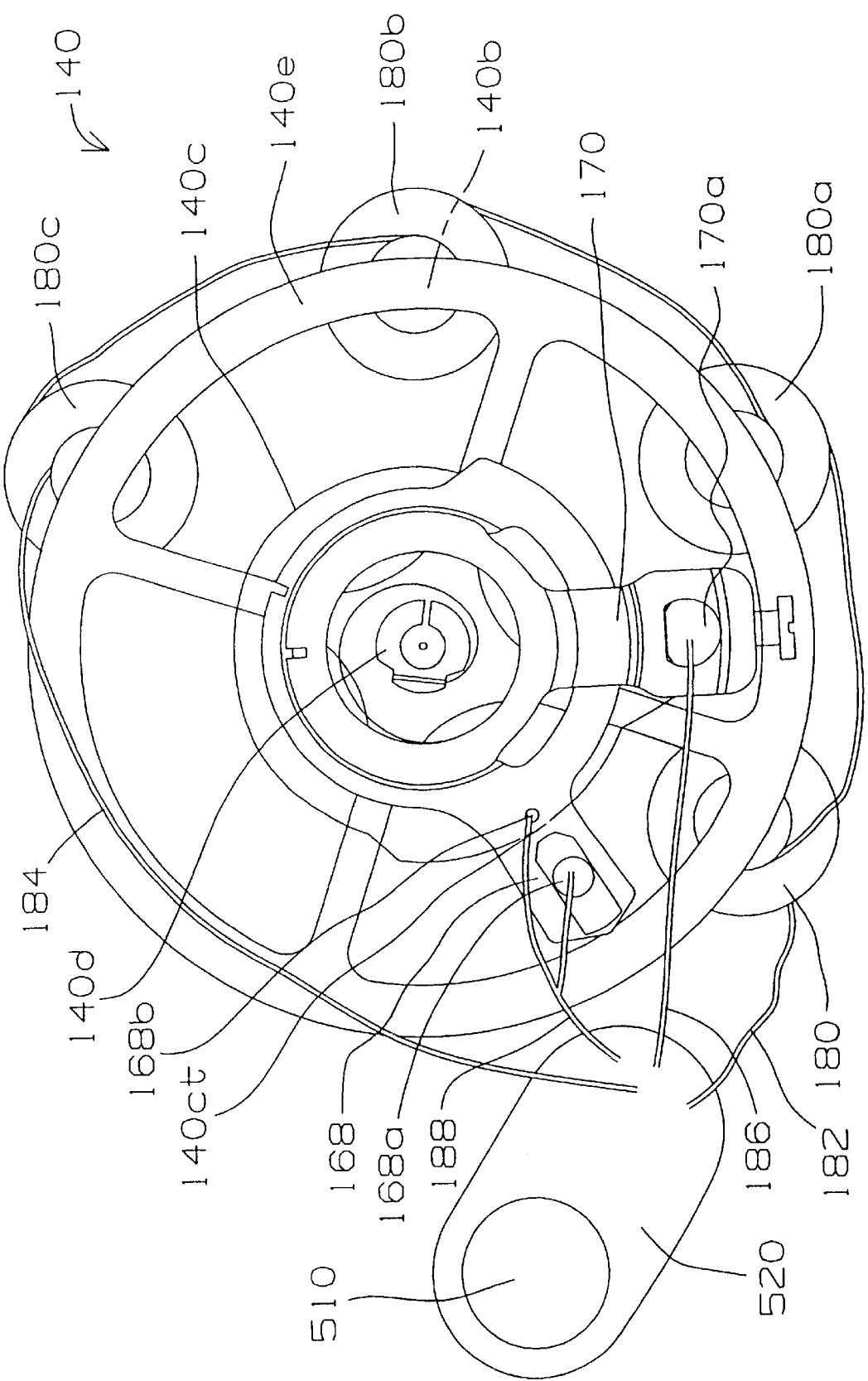
FIG. 3 is an enlarged partial plan view showing an outline construction of a balance in the mechanical watch having the attitude detection device of the invention when a switch mechanism is in an off state.

As shown in FIGS. 1 and 3, the circumferential intervals of a plurality of coils are preferably an integer times the circumferential interval between the S and N poles of the balance magnet 140e facing the coils. Not all the coils need to be arranged at the same intervals in the circumferential direction. Further, in configurations where a plurality of coils are provided, it is desired that wires between the coils be connected in series so as not to cancel the current generated in each coil by electromagnetic induction. Alternatively, the wires between the coils may be connected in parallel in such a manner that will not cancel the currents generated in these coils by electromagnetic induction.

Figure 5:
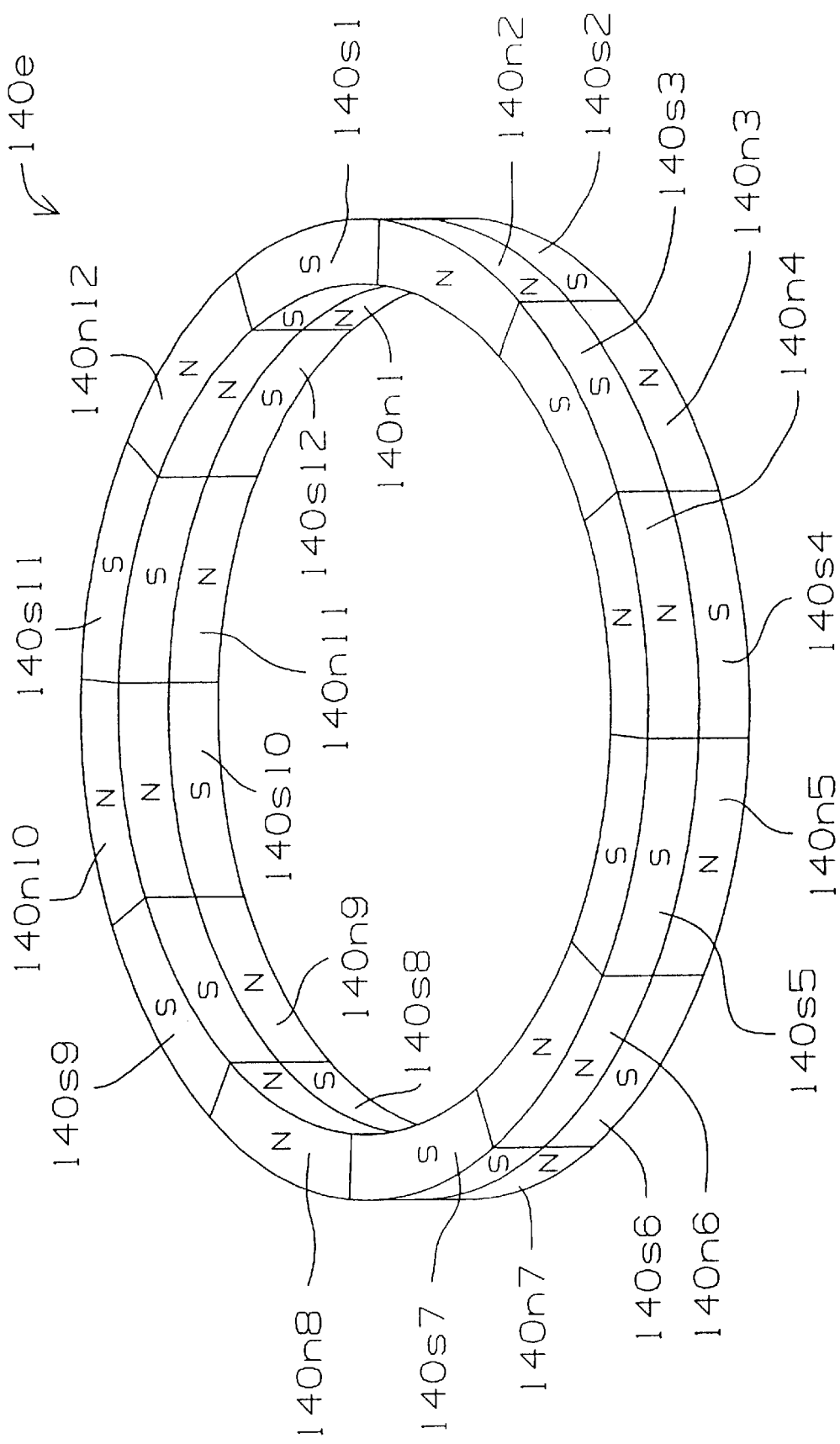
FIG. 5 is a perspective view showing an outline construction of a balance magnet used in the mechanical watch having the attitude detection device of the invention.

Referring to FIG. 5, the balance magnet 140e is shaped like a ring and has 12 magnet portions, each having vertically polarized S pole 140s1–140s12 and N pole 140n1–140n12, with S and N poles alternated in the circumferential direction. The number of magnet portions arranged in a ring pattern in the balance magnet 140e is 12 in the case of FIG. 5, but needs only to be two or more. It is preferred that the length of one magnet portion be almost equal to the outer diameter of one coil facing that magnet portion.

Figure 4:
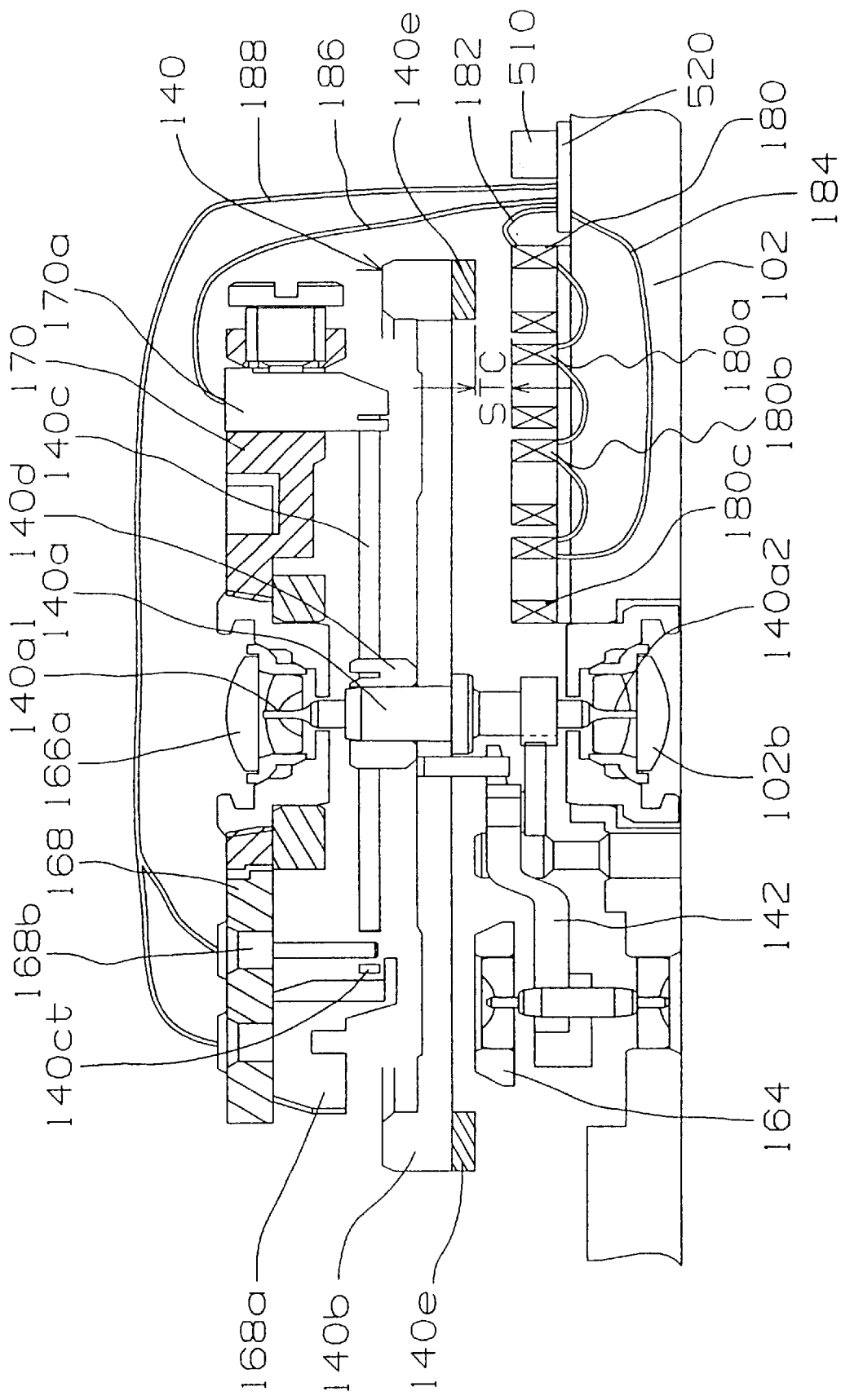
FIG. 4 is an enlarged partial cross section showing an outline construction of a balance in the mechanical watch having the attitude detection device of the invention when a switch mechanism is in an off state.

Referring to FIGS. 2 and 4, a gap is provided between the balance magnet 140e and the coils 180, 180a, 180b, 180c. The gap between the balance magnet 140e and the coils 180, 180a, 180b, 180c is determined so that the magnetic force of the balance magnet 140e can affect the coils 180, 180a, 180b, 180c when the coils 180, 180a, 180b, 180c are conducting.

When the coils 180, 180a, 180b, 180c are not conducting, the magnetic force of the balance magnet 140e does not influence the coils 180, 180a, 180b, 180c. The balance magnet 140e is secured, as by bonding, to the main plate side of the balance wheel 140b, with one of its sides placed in contact with a ring-shaped rim portion of the balance wheel 140b and the other side facing the front side of the main plate 102.

Although in FIG. 4 the hairspring 140c is shown exaggerated in terms of its thickness (in the radial direction of the balance), it is in fact 0.021 mm thick for example. The balance magnet 140e is about 9 mm in outer diameter, about 7 mm in inner diameter and about 1 mm in thickness, and has a residual flux density of approximately 1 tesla. The coils 180, 180a, 180b, 180c each have 1000 turns, for example, and their coil wire diameter is about 25 micrometers. The gap STC between the balance magnet 140e and the coils 180, 180a, 180b, 180c is about 0.4 mm for example.

(5) Attitude Detection Device and Circuit Block

Next, in the embodiment of the mechanical watch having the attitude detection device of the invention, explanations will be made of the attitude detection device 510 and a circuit block 520.

Referring to FIGS. 1 to 4, the attitude detection device 510 and the circuit block 520 are arranged on the front side of the main plate 102. The attitude detection device 510 is mounted on the circuit block 520. The circuit block 520 has a plurality of lead terminals.

In the embodiment of the mechanical watch having the attitude detection device of the invention, the attitude detection device 510 is arranged on the main plate 102 such that the X and Y axes are parallel to the surface of the main plate 102 and also to the surface of the dial 104. Hence, the attitude detection device 510 on the main plate 102 has its Z axis directed perpendicular to the surface of the main plate 102 and also to the surface of the dial 104.

A first lead wire 182 is arranged to connect one end of the coil 180 to a first lead terminal (not shown) of the circuit block 520. The other end of the coil 180 is connected to one end of the coil 180a. The other end of the coil 180a is connected to one end of the coil 180b. The other end of the coil 180b is connected to one end of the coil 180c. That is, the four coils 180, 180a, 180b, 180c are connected in series.

A second lead wire 184 is arranged to connect the other end of the coil 180c to a second lead terminal (not shown) of the circuit block 520. A third lead wire 186 is arranged to connect the stud support 170 to a third lead terminal (not shown) of the circuit block 520. A fourth lead wire 188 is arranged to connect the first contact member 168a and the second contact member 168b to the fourth lead terminal (not shown) of the circuit block 520.

Figure 9:
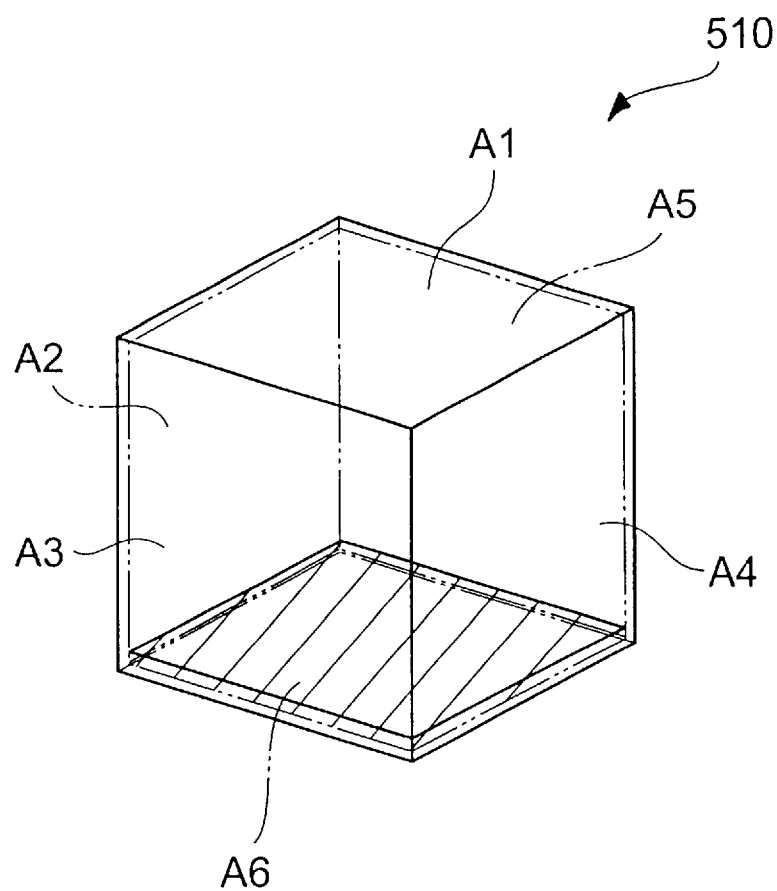
FIG. 9 is an enlarged perspective view showing a pattern of five electrodes in a conducting state in the first embodiment of the attitude detection device of the invention (In FIG. 9 the lines representing the thickness of each electrode are omitted).

FIG. 9 shows the state of the attitude detection device 510 when the mechanical watch having the attitude detection device of this invention takes the "horizontal attitude." In the state shown in FIG. 9, the conductive fluid 530 shorts the electrode A2, electrode A3, electrode A4, electrode A5 and electrode A6 (that is, they are all electrically connected).

Figure 10:
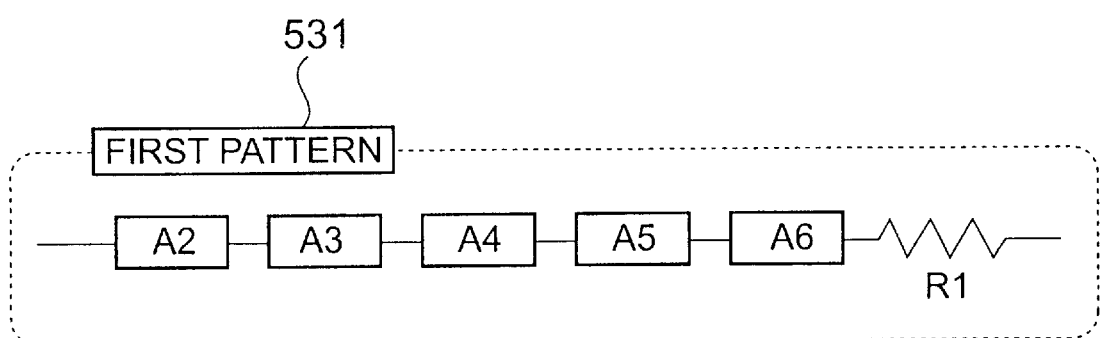
FIG. 10 is a circuitry showing a pattern of five electrodes in a conducting state in the first embodiment of the attitude detection device of the invention.

Referring to FIG. 10, when the electrodes A2, A3, A4, A5, A6 in the state of FIG. 9 are all electrically connected to one another, the circuit block 520 forms a first pattern 531 connecting a resistance R1 in series with the electrodes A2, A3, A4, A5, A6. In the state of FIG. 9, the first pattern 531 connects the resistance R1 in series with the four coils 180, 180a, 180b, 180c.

Figure 11:
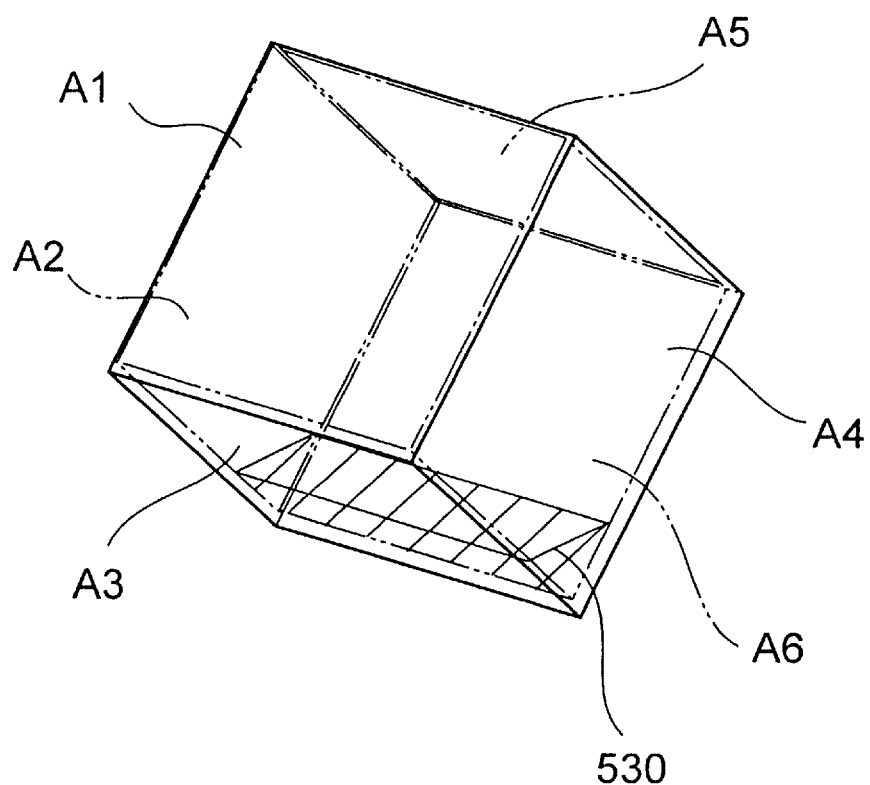
FIG. 11 is an enlarged perspective view showing a pattern of four electrodes in a conducting state in the first embodiment of the attitude detection device of the invention.

FIG. 11 shows the state of the attitude detection device 510 when the mechanical watch with the attitude detection device of this invention is arranged to have the dial inclined 45 degrees to the horizontal plane. In this state of FIG. 9, the conductive fluid 530 short-circuits the electrodes A2, A3, A4, A6 (i.e., these electrodes are electrically connected to one another).

Figure 12:
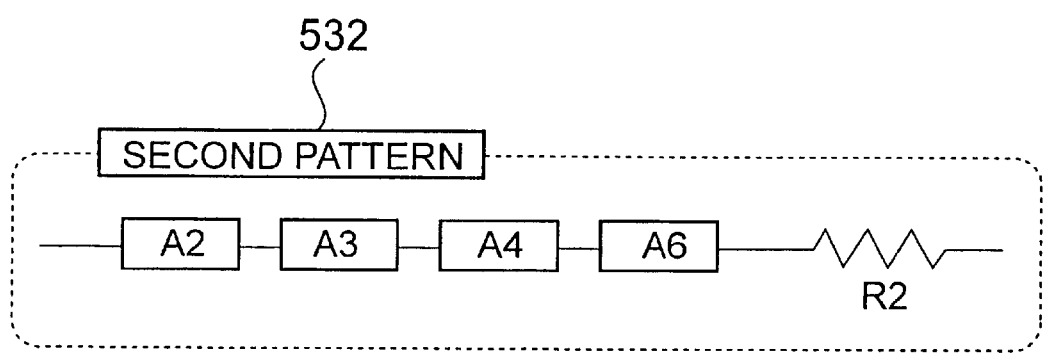
FIG. 12 is a circuitry showing a pattern of four electrodes in a conducting state in the first embodiment of the attitude detection device of the invention.

Referring to FIG. 12, when the electrodes A2, A3, A4, A6 in the state of FIG. 11 are electrically connected to one another, the circuit block 520 forms a second pattern 532 connecting a resistance R2 in series with the electrodes A2, A3, A4, A6. In the state of FIG. 11, the second pattern 532 connects the resistance R2 in series with the four coils 180, 180a, 180b, 180c.

Figure 13:
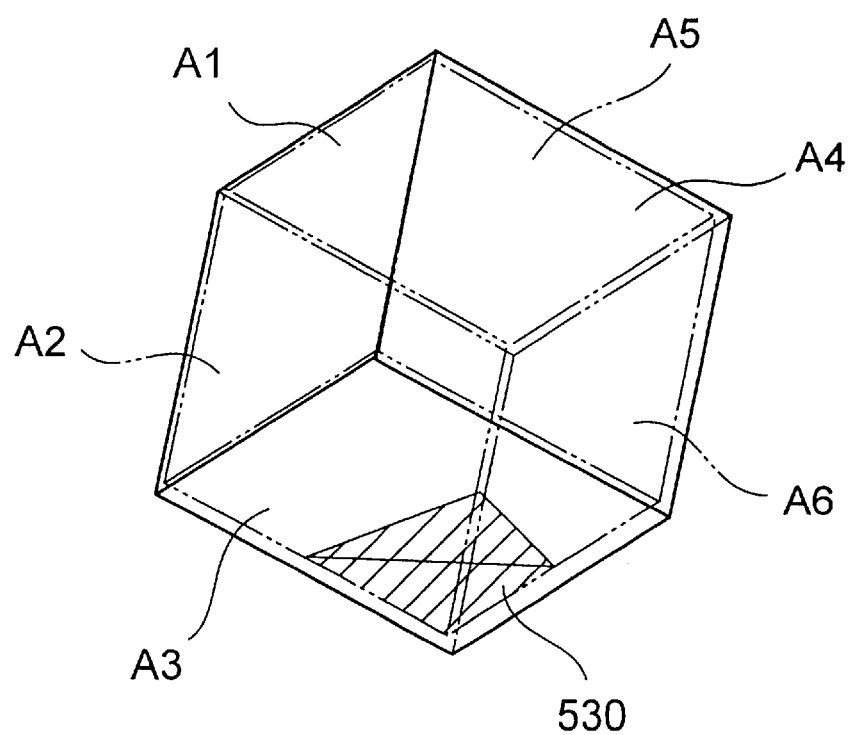
FIG. 13 is an enlarged perspective view showing a pattern of three electrodes in a conducting state in the first embodiment of the attitude detection device of the invention.

FIG. 13 shows another state of the attitude detection device 510 when the mechanical watch with the attitude detection device of this invention is arranged to have the dial inclined 45 degrees to the horizontal plane but in a state different from that shown in FIG. 11. In the state of FIG. 13, the conductive fluid 530 short-circuits the electrodes A2, A3, A6 (i.e., these electrodes are electrically connected to one another).

Figure 14:
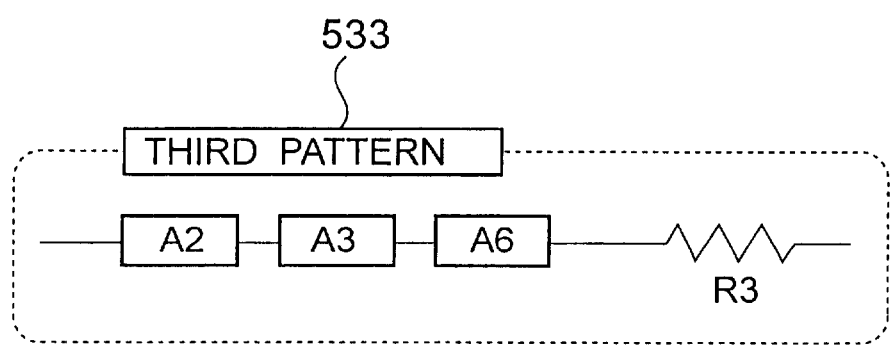
FIG. 14 is a circuitry showing a pattern of three electrodes in a conducting state in the first embodiment of the attitude detection device of the invention.

Referring to FIG. 14, when the electrodes A3, A3, A6 in the state of FIG. 13 are electrically connected to one another, the circuit block 520 forms a third pattern 533 connecting a resistance R3 in series with the electrodes A2, A3, A6. In the state of FIG. 13, the third pattern 533 connects the resistance R3 in series with the four coils 180, 180a, 180b, 180c.

FIG. 15 shows the relation between a variety of electrode patterns in conduction and the resistance provided in the circuit, in the first embodiment of the attitude detection device of the invention.

In FIG. 15, the rotation angle about the X axis is taken as α, and the rotation angle about the Y axis as β. At this time the rotation angle about the Z axis is arbitrary.

It should be noted that, for each attitude value shown in FIG. 15, the attitude state detected varies depending on the amount of the conductive fluid.

In FIG. 15, A1, A2, A3, A4, A5 and A6 represent the electrode A2, electrode A3, electrode A4, electrode A5 and electrode A6, respectively. "ON" means that the associated electrode is electrically conducting to other "ON" electrodes. "OFF" means that the associated electrode is not electrically conducting to any other electrodes.

(Attitude State 1)

An attitude state 1 shown in FIG. 15 corresponds to a case where the mechanical watch with the attitude detection device of this invention is in the "horizontal attitude." The attitude state 1 falls in a range where the α is between −7 degrees and +7 degrees and the β is between −7 degrees and +7 degrees.

In this attitude state 1, the circuit block 520 is arranged to electrically connect the electrodes A2, A3, A4, A5 and A6 together and connect the resistance R1 in series with the electrodes A2, A3, A4, A5 and A6. In this attitude state 1, the first pattern 531 connects the resistance R1 in series with the four coils 180, 180a, 180b, 180c. The value of the resistance R1 at this time is taken as a reference value Rref (ohm).

For example, when a combined resistance value of the four coils 180, 180a, 180b, 180c is 1.7 kilo-ohms, the reference value Rref is 1.2 kilo-ohms.

(Attitude State 2)

The attitude state 2 shown in FIG. 15 corresponds to a case where the mechanical watch with the attitude detection device of this invention is in the "9-hour up (9U) attitude". The attitude state 2 falls in a range where the α is between −7 degrees and +7 degrees and the β is between +83 degrees and +97 degrees.

In the attitude state 2, the circuit block 520 is arranged to electrically connect the electrodes A1, A3, A4, A5 and A6 together and connect the resistance R2 (not shown) in series with the electrodes A1, A3, A4, A5 and A6. In this attitude state 2, the resistance R2 is connected in series with the four coils 180, 180a, 180b, 180c. The value of the resistance R2 at this time is 3.48 times the reference value Rref (ohm) (i.e., 3.48×Rref).

(Attitude State 3)

The attitude state 3 shown in FIG. 15 corresponds to a case where the mechanical watch with the attitude detection device of this invention is in the "12-hour up (12U) attitude". The attitude state 3 falls in a range where the α is between +83 degrees and +97 degrees and the β is between −7 degrees and +7 degrees.

In the attitude state 3, the circuit block 520 is arranged to electrically connect the electrodes A1, A2, A4, A5 and A6 together and connect the resistance R2 (not shown) in series with the electrodes A1, A2, A4, A5 and A6. In this attitude state 3, the resistance R2 is connected in series with the four coils 180, 180a, 180b, 180c. The value of the resistance R2 at this time is 3.48 times the reference value Rref (ohm) (i.e., 3.48×Rref).

(Attitude State 4)

The attitude state 4 shown in FIG. 15 corresponds to a case where the mechanical watch with the attitude detection device of the invention is in the "3-hour up (3U) attitude". The attitude state 4 falls in a range where the α is between −7 degrees and +7 degrees and the β is between −83 degrees and +97 degrees.

In the attitude state 4, the circuit block 520 is arranged to electrically connect the electrodes A1, A2, A3, A5 and A6 together and connect the resistance R2 (not shown) in series with the electrodes A1, A2, A3, A5 and A6. In this attitude state 4, the resistance R2 is connected in series with the four coils 180, 180a, 180b, 180c. The value of the resistance R2 at this time is 3.48 times the reference value Rref (ohm) (i.e., 3.48×Rref).

(Attitude State 5)

The attitude state 5 shown in FIG. 15 corresponds to a case where the mechanical watch with the attitude detection device of this invention is in the "6-hour up (6U) attitude". The attitude state 5 falls in a range where the α is between −83 degrees and +97 degrees and the β is between −7 degrees and +7 degrees.

In the attitude state 5, the circuit block 520 is arranged to electrically connect the electrodes A1, A2, A3, A4 and A6 together and connect the resistance R2 (not shown) in series with the electrodes A1, A2, A3, A4 and A6. In this attitude state 5, the resistance R2 is connected in series with the four coils 180, 180a, 180b, 180c. The value of the resistance R2 at this time is 3.48 times the reference value Rref (ohm) (i.e., 3.48×Rref).

(Attitude State 6)

The attitude state 6 shown in FIG. 15 corresponds to a case where the mechanical watch with the attitude detection device of this invention is in the "inverted horizontal attitude". The attitude state 6 falls in a range where the α is between +173 degrees and +187 degrees and the β is between −7 degrees and +7 degrees.

In the attitude state 6, the circuit block 520 is arranged to electrically connect the electrodes A1, A2, A3, A4 and A5 together and connect the resistance R2 (not shown) in series with the electrodes A1, A2, A3, A4 and A5. In this attitude state 6, the resistance R2 is connected in series with the four coils 180, 180a, 180b, 180c. The value of the resistance R2 at this time is 3.48 times the reference valueRref (ohm) (i.e., 3.48×Rref).

(Attitude States 7–18)

The attitude states 7–18 shown in FIG. 15 correspond to cases where the mechanical watch with the attitude detection device of this invention is neither in the "horizontal attitude" or "inverted horizontal attitude" or "vertical attitude".

The attitude state 7 falls in a range where the α is between −7 degrees and −83 degrees and the β is between −7 degrees and +7 degrees.

In the attitude state 7, the circuit block 520 is arranged to electrically connect the electrodes A2, A3, A4 and A6 together and connect the resistance R3 (not shown) in series with the electrodes A2, A3, A4 and A6. In this attitude state 7, the resistance R3 is connected in series with the four coils 180, 180a, 180b, 180c. The value of the resistance R3 at this time is 1.83 times the reference value Rref (ohm) (i.e., 1.83×Rref).

Similarly, in the attitude states 8–18 shown in FIG. 15, the resistance R3 is connected in series with the four coils 180, 180a, 180b, 180c.

(Attitude States 19–26)

The attitude states 19–26 shown in FIG. 15 correspond to cases where the mechanical watch with the attitude detection device of this invention has its dial in a vertical position.

The attitude state 19 falls in a range where the α is between −7 degrees and −83 degrees and the β is between −7 degrees and −83 degrees.

In the attitude state 19, the circuit block 520 is arranged to electrically connect the electrodes A2, A3 and A6 together and connect the resistance R2 (not shown) in series with the electrodes A2, A3 and A6. In this attitude state 19, the resistance R2 is connected in series with the four coils 180, 180a, 180b, 180c. The value of the resistance R2 at this time is 3.48 times the reference value Rref (ohm) (i.e., 3.48× Rref).

Similarly, in the attitude states 20–26 shown in FIG. 15, the resistance R2 is connected in series with the four coils 180, 180a, 180b, 180c.

The resistance reference value Rref is determined by considering a braking force of the balance 140 described later which restricts the rotation of the balance 140. The resistance reference value Rref may be determined either by calculation or by experiment.

(6) Second Embodiment of Attitude Detection Device of the Invention

Next the construction of the second embodiment of the attitude detection device of the invention will be described.

Figure 19:
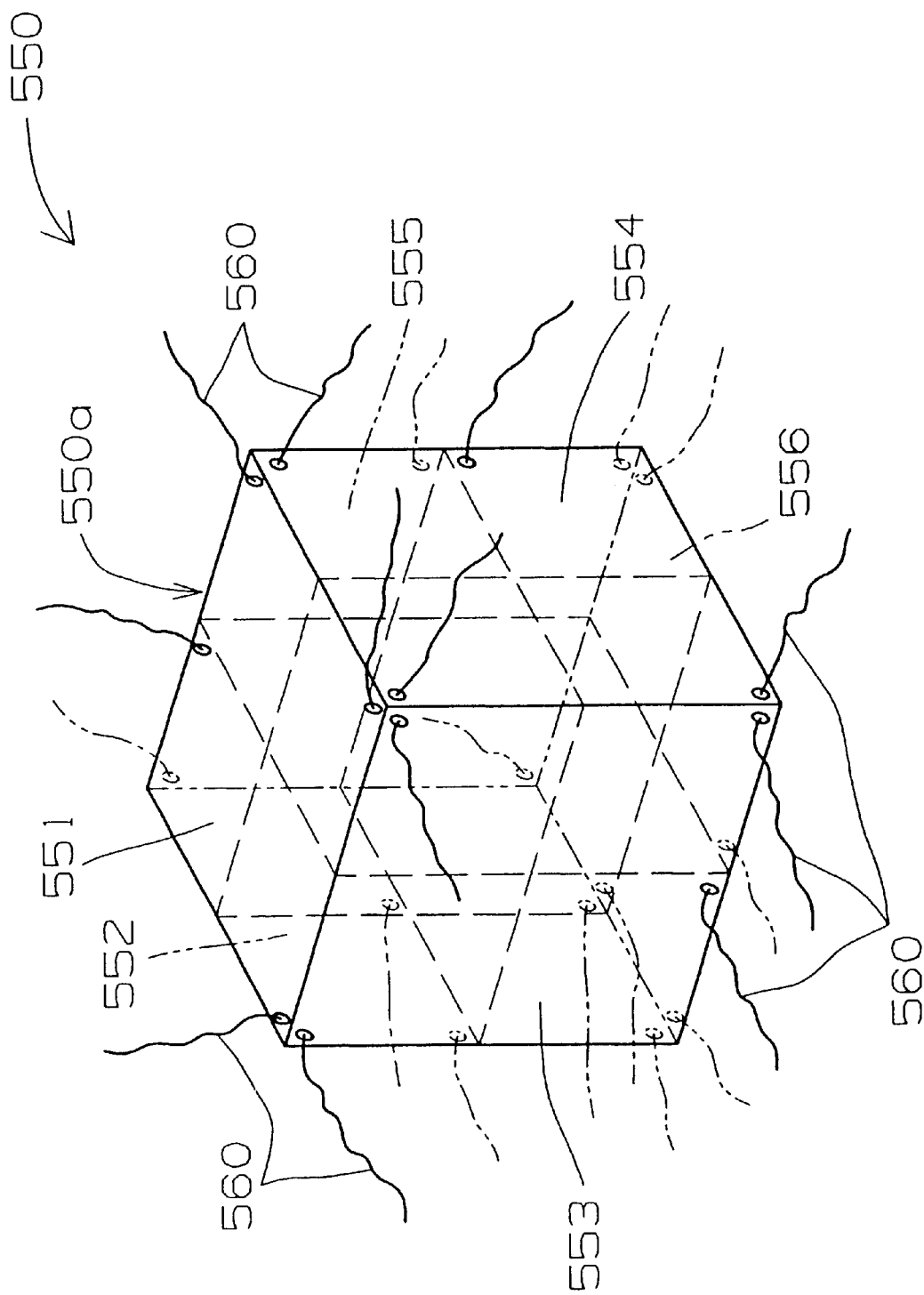
FIG. 19 is an enlarged perspective view showing an outline construction of a second embodiment of the attitude detection device of the invention (In FIG. 19 a part of reference numbers of lead wires is omitted).

Referring to FIG. 19, an attitude detection device 550 has an almost cubicle-shaped case 550a. The case 550a includes a tap wall 551, four side walls 552, 553, 554, 555 and a bottom wall 556.

The case 550a is formed of plastics such as polyimide, glass epoxy boards and insulating materials such as quartz.

In the case 550a, the top wall 551 crosses each of the side walls 552, 553, 554, 555 perpendicularly.

The bottom wall 556 crosses each of the side walls 552, 553, 554, 555 perpendicularly.

The side wall 552 crosses the side wall 553 and the side wall 555 perpendicularly.

The side wall 554 crosses the side wall 553 and the side wall 555 perpendicularly.

Figure 20:
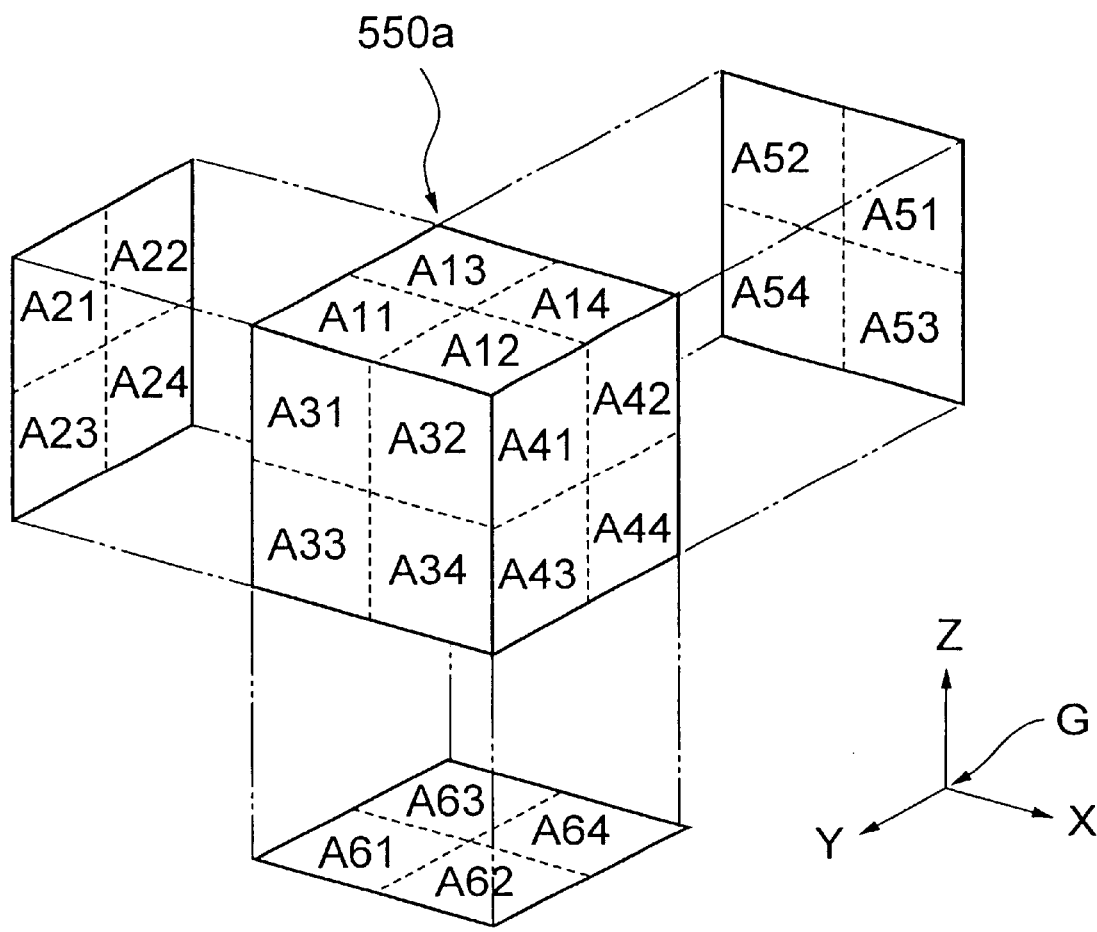
FIG. 20 is an enlarged perspective view showing an outline construction of electrode patterns in the second embodiment of the attitude detection device of the invention.

Referring to FIG. 20, four electrodes A11, A12, A13, A14 are provided on the inner surface of the top wall 551. The four electrodes A11, A12, A13, A14 have square shapes of almost the same size and are insulated from one another.

Four electrodes A21, A22, A23, A24 are provided on the inner surface of the side wall 552. The four electrodes A21, A22, A23, A24 have square shapes of almost the same size and are insulated from one another.

Four electrodes A31, A32, A33, A34 are provided on the inner surface of the side wall 553. The four electrodes A31, A32, A33, A34 have square shapes of almost the same size and are insulated from one another.

Four electrodes A41, A42, A43, A44 are provided on the inner surface of the side wall 554. The four electrodes A41, A42, A43, A44 have square shapes of almost the same size and are insulated from one another.

Four electrodes A51, A52, A53, A54 are provided on the inner surface of the side wall 554. The four electrodes A51, A52, A53, A54 have almost square shapes and are insulated from one another.

Four electrodes A61, A62, A63, A64 are provided on the inner surface of the bottom wall 556. The four electrodes A61, A62, A63, A64 have square shapes of almost the same size and are insulated from one another.

Although FIG. 20 shows the electrodes A21–A24, electrodes A51–A54 and electrodes A61–A64 to be separated from the case 550a to facilitate the explanation, they are in fact arranged to form an almost cubicle body. These electrodes are arranged at intervals, i.e., insulated from one another.

These electrodes A11–A64 are preferably formed identical.

In FIG. 20, a gravity center G of the cubicle case 550a is defined to be an origin of a coordinate system, as in the case of FIG. 8. The X axis and the positive direction of the X axis, the Y axis and the positive direction of the Y axis, and the Z axis and the positive direction of the Z axis are also defined in the same manner as in FIG. 8.

In the embodiment of the mechanical watch having the attitude detection device of this invention, the attitude detection device 550 is arranged on the main plate 102 such that the X and Y axes are parallel to the surface of the main plate 102 and also to the surface of the dial 104. Hence, the attitude detection device 510 on the main plate 102 has its Z axis directed perpendicular to the surface of the main plate 102 and to the surface of the dial 104.

Referring to FIG. 19, the electrode lead wires 560 are connected to respective electrodes.

Figure 21:
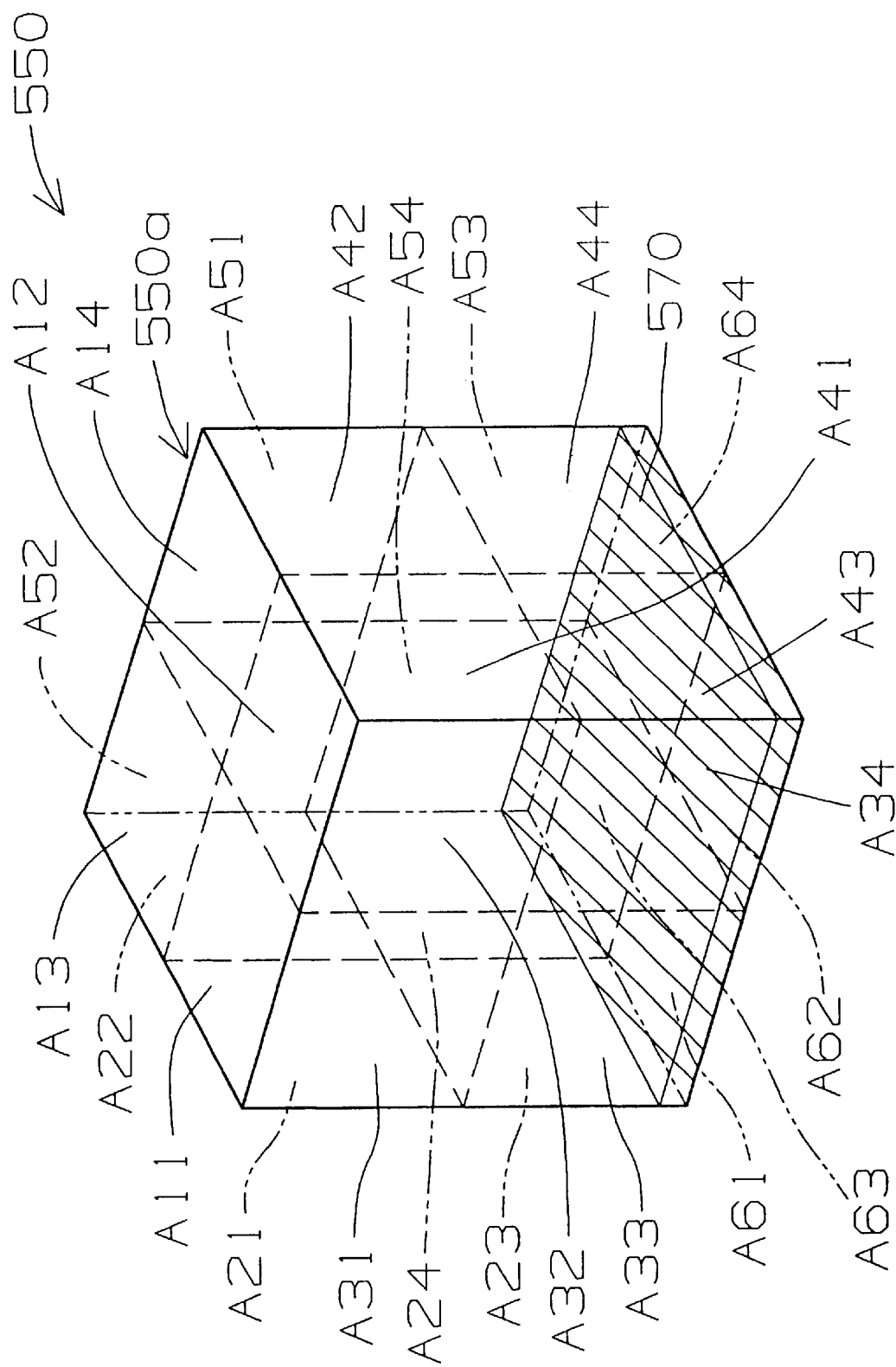
FIG. 21 an enlarged perspective view showing a pattern of 12 electrodes in a conducting state in the second embodiment of the attitude detection device of the invention.

Referring to FIG. 21, a conductive fluid 570 is accommodated in the case 550a. The conductive fluid 570 is mercury for example. The volume of the conductive fluid 570 is, in the case of FIG. 21, 1/48 that of the case 550a but should preferably be 1/48 to 1/348 the volume of the case 550a.

FIG. 21 shows the state of the attitude detection device 550 when the mechanical watch with the attitude detection device of this invention is set in the "horizontal attitude." In the state shown in FIG. 21, the conductive fluid 570 is in contact with the electrodes A23, A24, A33, A34, A43, A44, A53, A54, A61, A62, A63 and A64 but not with other electrodes. Hence, in the state of FIG. 21, the conductive fluid 570 short-circuits the electrodes A23, A24, A33, A34, A43, A44, A53, A54, A61, A62, A63 and A64 (i.e., electrically connected to one another).

Figure 22:
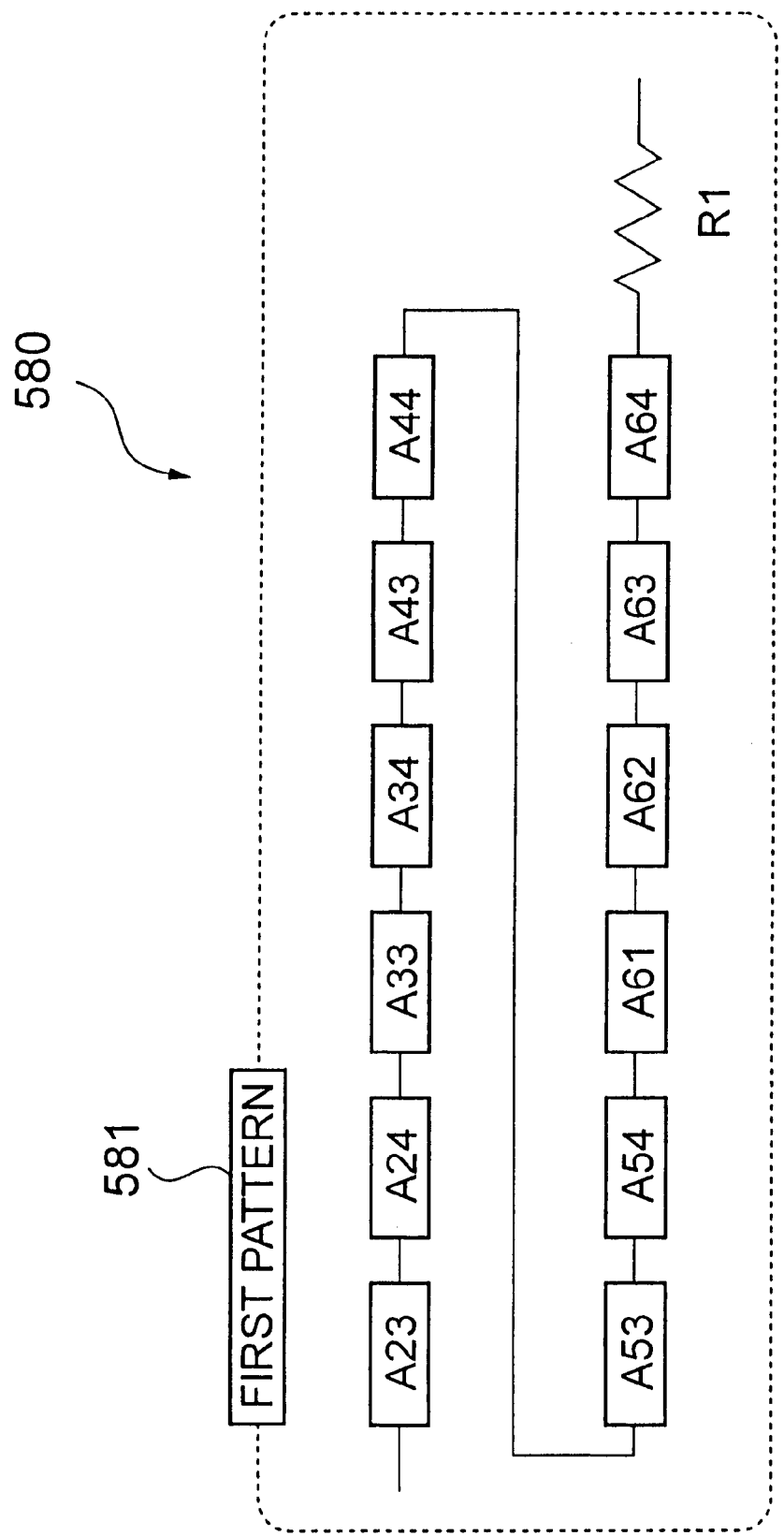
FIG. 22 is a circuitry showing a pattern of 12 electrodes in a conducting state in the second embodiment of the attitude detection device of the invention.

Referring to FIG. 22, when the electrodes A23, A24, A33, A34, A43, A44, A53, A54, A61, A62, A63 and A64 in the state of FIG. 21 are all electrically connected to one another, the circuit block 580 forms a first pattern 581 connecting a resistance R1 in series with these electrodes. In the state of FIG. 22, the first pattern 581 connects the resistance R1 in series with the four coils 180, 180a, 180b, 180c.

Figure 23:
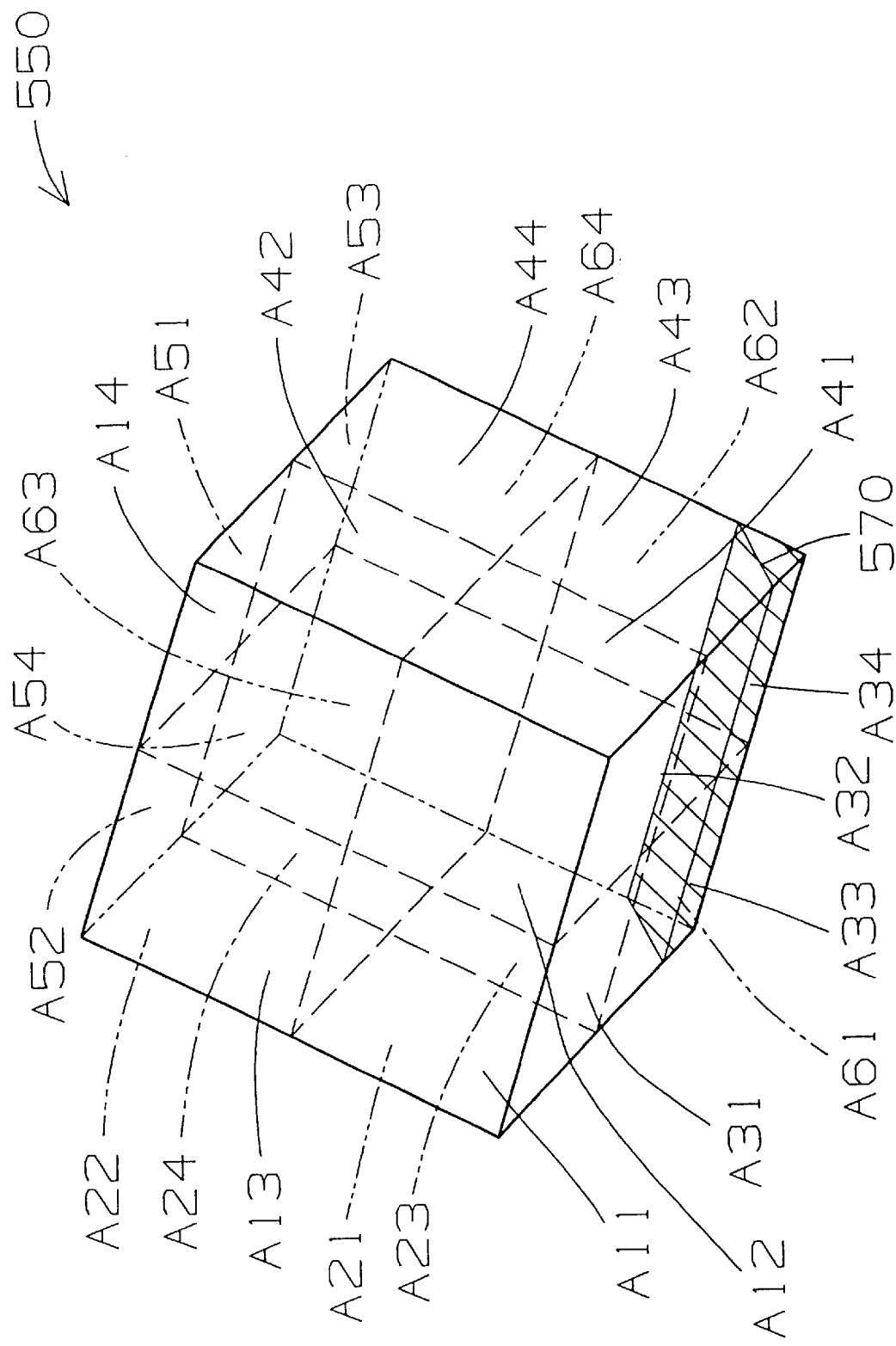
FIG. 23 is an enlarged perspective view showing a pattern of six electrodes in a conducting state in the second embodiment of the attitude detection device of the invention.

FIG. 23 shows the state of the attitude detection device 550 when the mechanical watch with the attitude detection device of the invention is arranged to have the dial inclined 45 degrees to the horizontal plane. In this state of FIG. 23, the conductive fluid 570 short-circuits the electrodes A23, A33, A34, A43, A61, A62 (i.e., these electrodes are electrically connected to one anther).

Figure 24:
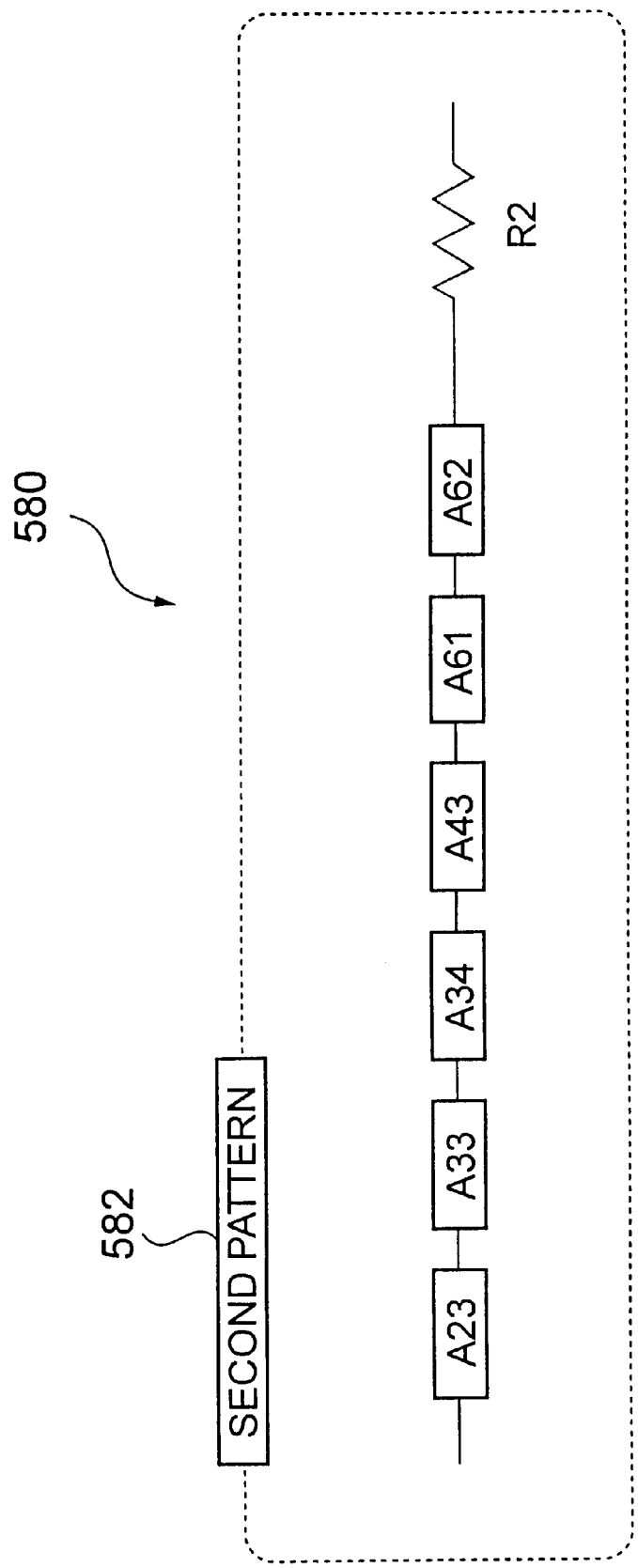
FIG. 24 is a circuitry showing a pattern of six electrodes in a conducting state in the second embodiment of the attitude detection device of the invention.

Referring to FIG. 24, when the electrodes A23, A33, A34, A43, A61, A62 in the state of FIG. 23 are electrically connected to one another, the circuit block 580 forms a second pattern 582 connecting a resistance R2 in series with these electrodes. In the state of FIG. 23, the second pattern 582 connects the resistance R2 in series with the four coils 180, 180a, 180b, 180c.

Figure 25:
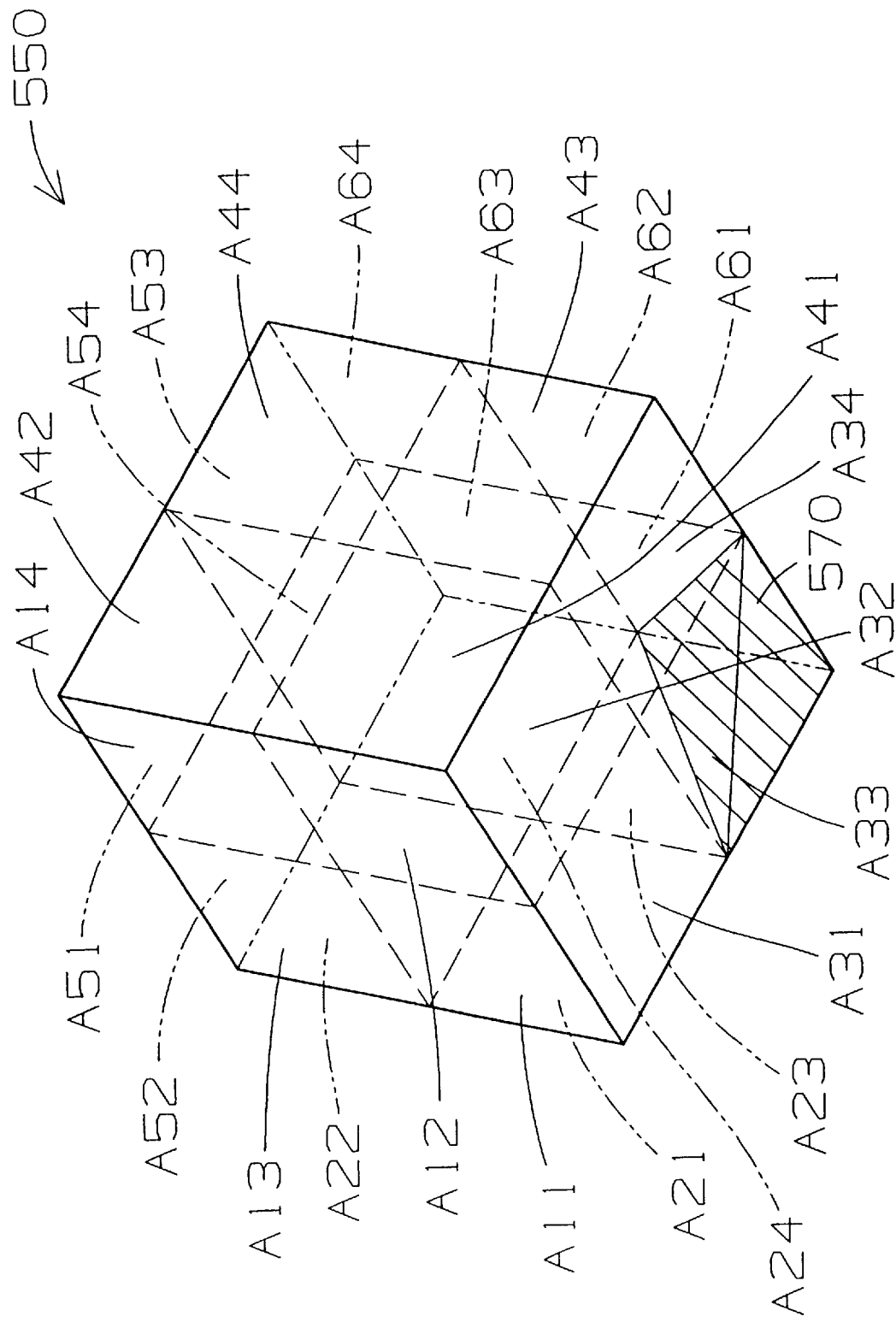
FIG. 25 is an enlarged perspective view showing a pattern of three electrodes in a conducting state in the second embodiment of the attitude detection device of the invention.

FIG. 25 shows another state of the attitude detection device 550 when the mechanical watch with the attitude detection device of this invention is arranged to have the dial inclined 45 degrees to the horizontal plane but in a state different from that shown in FIG. 23. In the state of FIG. 25, the conductive fluid 570 short-circuits the electrodes A23, A33 and A61 (i.e., these electrodes are electrically connected to one another).

Figure 26:
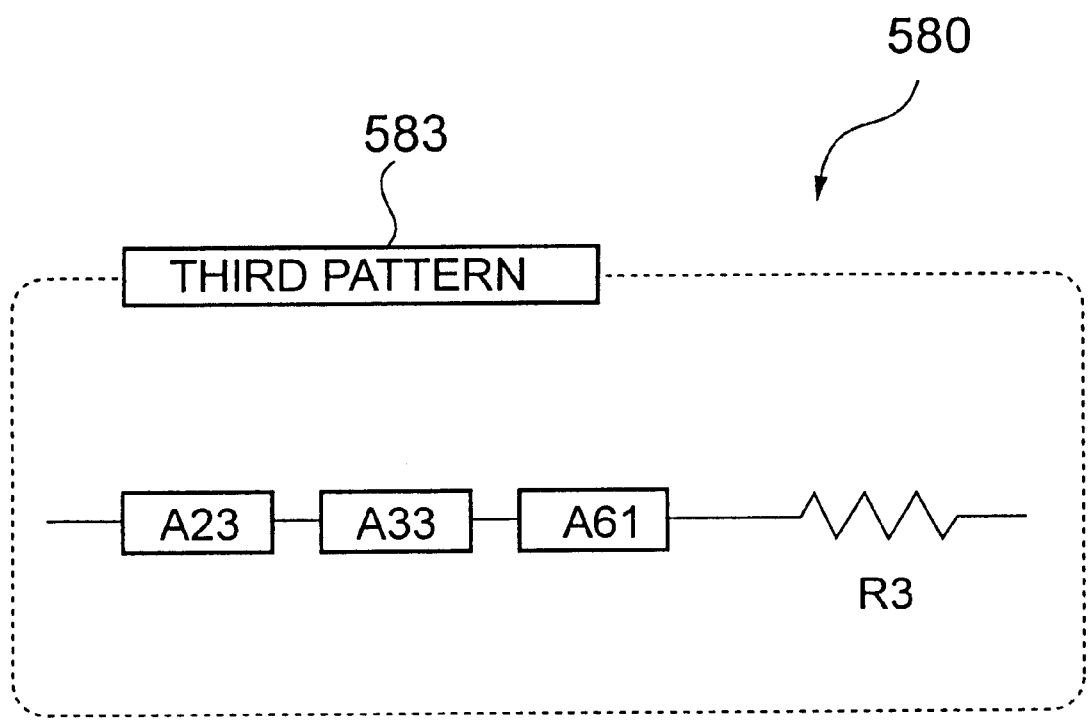
FIG. 26 is a circuitry showing a pattern of three electrodes in a conducting state in the second embodiment of the attitude detection device of the invention.

Referring to FIG. 26, when the electrodes A23, A33, A61 in the state of FIG. 25 are electrically connected to one another, the circuit block 580 forms a third pattern 583 connecting a resistance R3 in series with these electrodes. In the state of FIG. 25, the third pattern 583 connects the resistance R3 in series with the four coils 180, 180a, 180b, 180c.

For this attitude detection device 550 of the second embodiment of the invention, a table can be generated which, like the one shown in FIG. 15, shows the relation between the conducting state of each of various electrode patterns and the resistance provided in the circuit block.

That is, in the second embodiment of the attitude detection device of the invention arranged in a variety of attitudes, the wiring and the resistance in the circuit block can be determined by performing calculation as in the table of FIG. 15 or by conducting experiments.

Referring to FIG. 28, an attitude state 1 corresponds to a case where the mechanical watch with the attitude detection device of this invention is in the "horizontal attitude." The attitude state 1 falls in a range where the $\alpha$ is between −2.5 degrees and +2.5 degrees and the $\beta$ is between −2.5 degrees and +2.5 degrees.

In this attitude state 1, the electrodes A23, A24, A33, A34, A43, A44, A53, A54, A61, A62, A63, A64 are conducting to one another and the resistance R1 is connected in series with these electrodes. In this attitude state 1, the first pattern 581 connects the resistance R1 in series with the four coils 180, 180a, 180b, 180c. The value of the resistance R1 at this time is taken as a reference value Rref (ohm).

For example, when a combined resistance value of the four coils 180, 180a, 180b, 180c is 1.7 kilo-ohms, the reference value Rref is 1.2 kilo-ohms.

The attitude state 2 in FIG. 28 corresponds to a case where the $\alpha$ is between −4.5 degrees and +85.5 degrees and the $\beta$ is between −14 degrees and +14 degrees.

In this attitude state 2, the electrodes A23, A33, A34, A43, A61, A62 are conducting to one another and the resistance R2 is connected in series with these electrodes. In this attitude state 2, the second pattern 582 connects the resistance R2 in series with the four coils 180, 180a, 180b, 180c.

The attitude state 3 in FIG. 28 corresponds to a case where the $\alpha$ is approximately 45 degrees and the $\beta$ is between about 45 degrees.

In this attitude state 3. the electrodes A23, A33, A61 are conducting to one another and the resistance R3 is connected in series with these electrodes. In this attitude state 3, the third pattern 583 connects the resistance R3 in series with the four coils 180, 180a, 180b, 180c.

The relation between the electrode conduction state and the resistance can be determined for a variety of attitude states in a way similar to that of FIG. 15 (FIG. 28 does not list all the possible cases). It is noted that, for each attitude value shown in FIG. 28, the attitude state detected varies depending on the amount of the conductive fluid.

Figure 29:
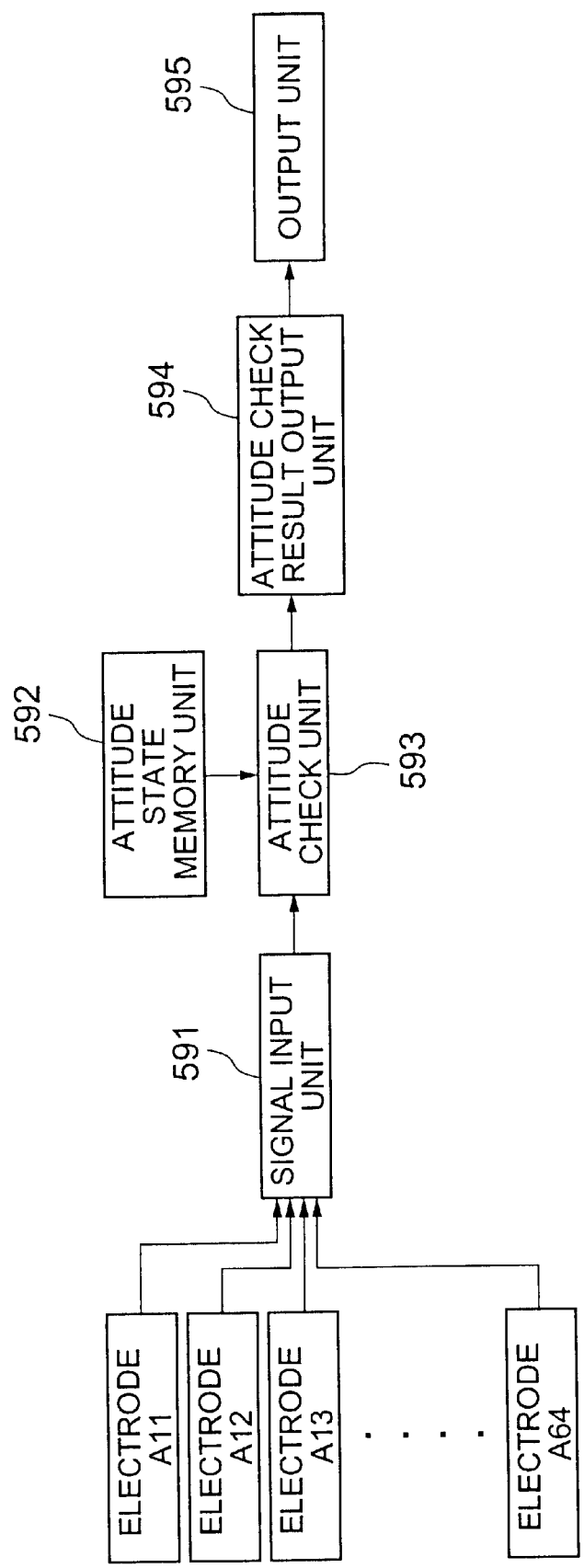
FIG. 29 is a representative block diagram showing a configuration of a circuit for detecting the attitude of equipment having the second embodiment of the attitude detection device of the invention.
Figure 30:
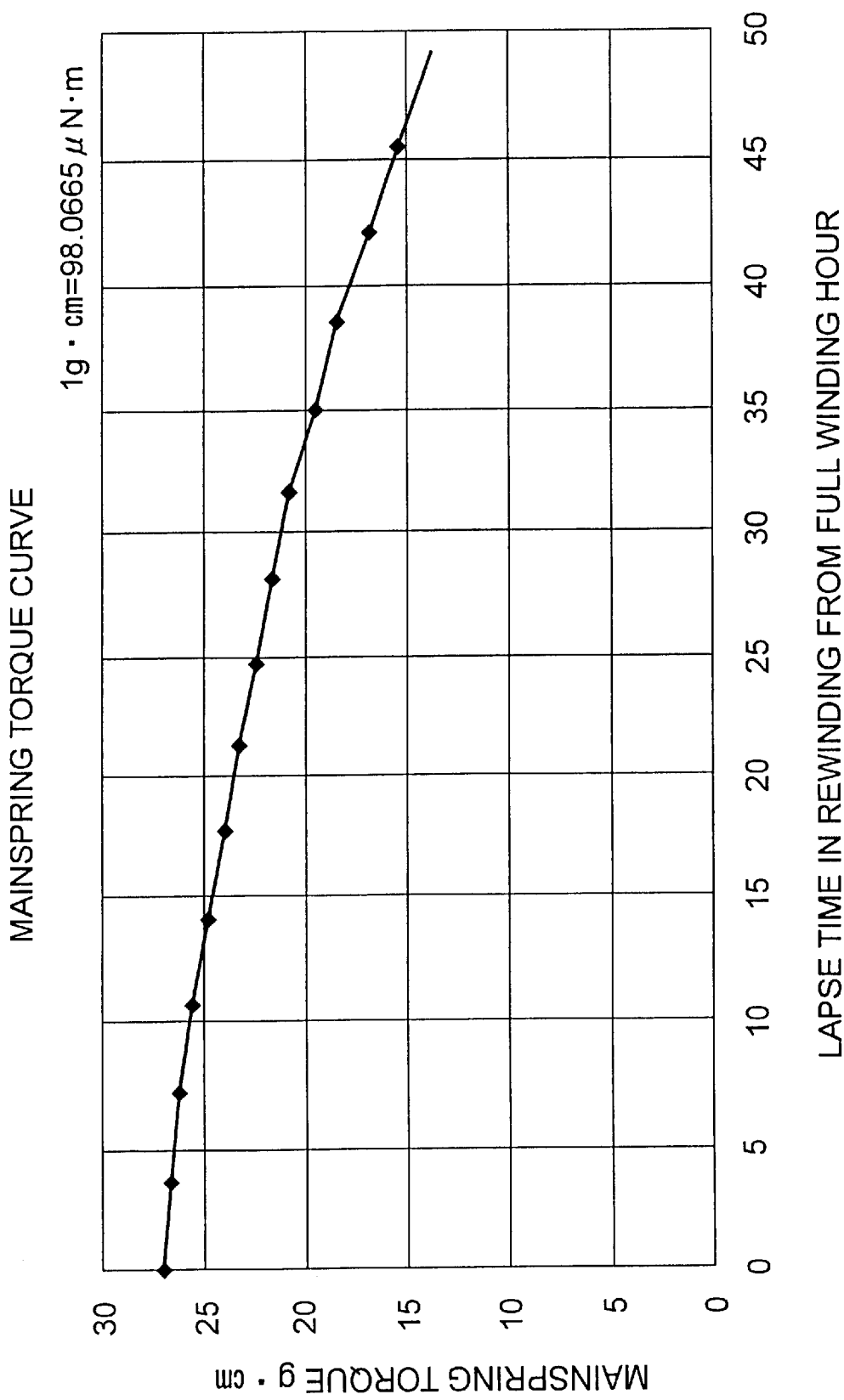
FIG. 30 is a graph schematically showing the relation between a mainspring torque and an elapsed time from a fully wound state of the spring in a mechanical watch.
Figure 31:
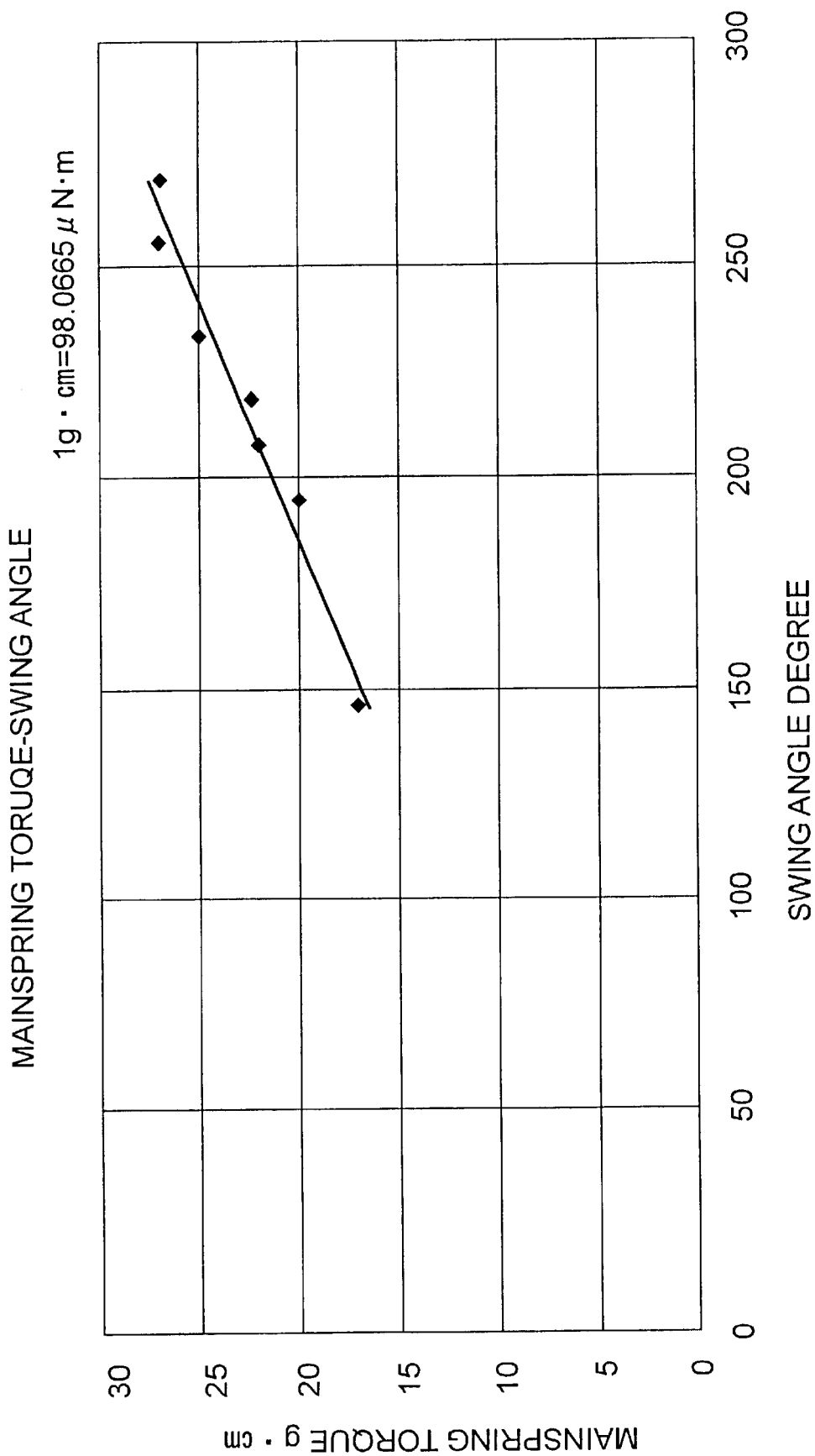
FIG. 31 is a graph schematically showing the relation between a mainspring torque and a deflection angle of the balance in a mechanical watch.
Figure 32:
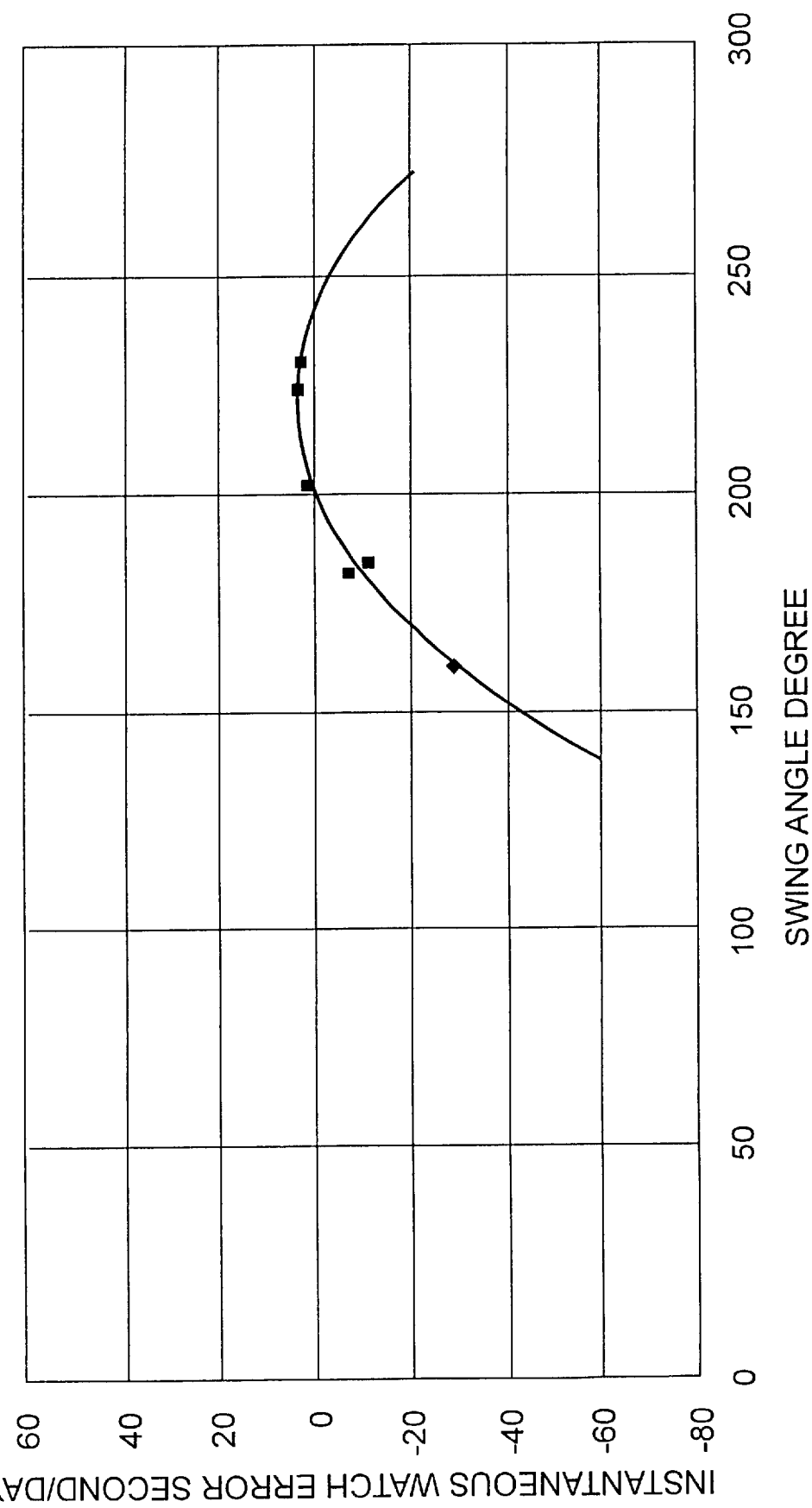
FIG. 32 is a graph schematically showing the relation between a deflection angle of the balance and an instantaneous watch error in the mechanical watch.
Figure 33:
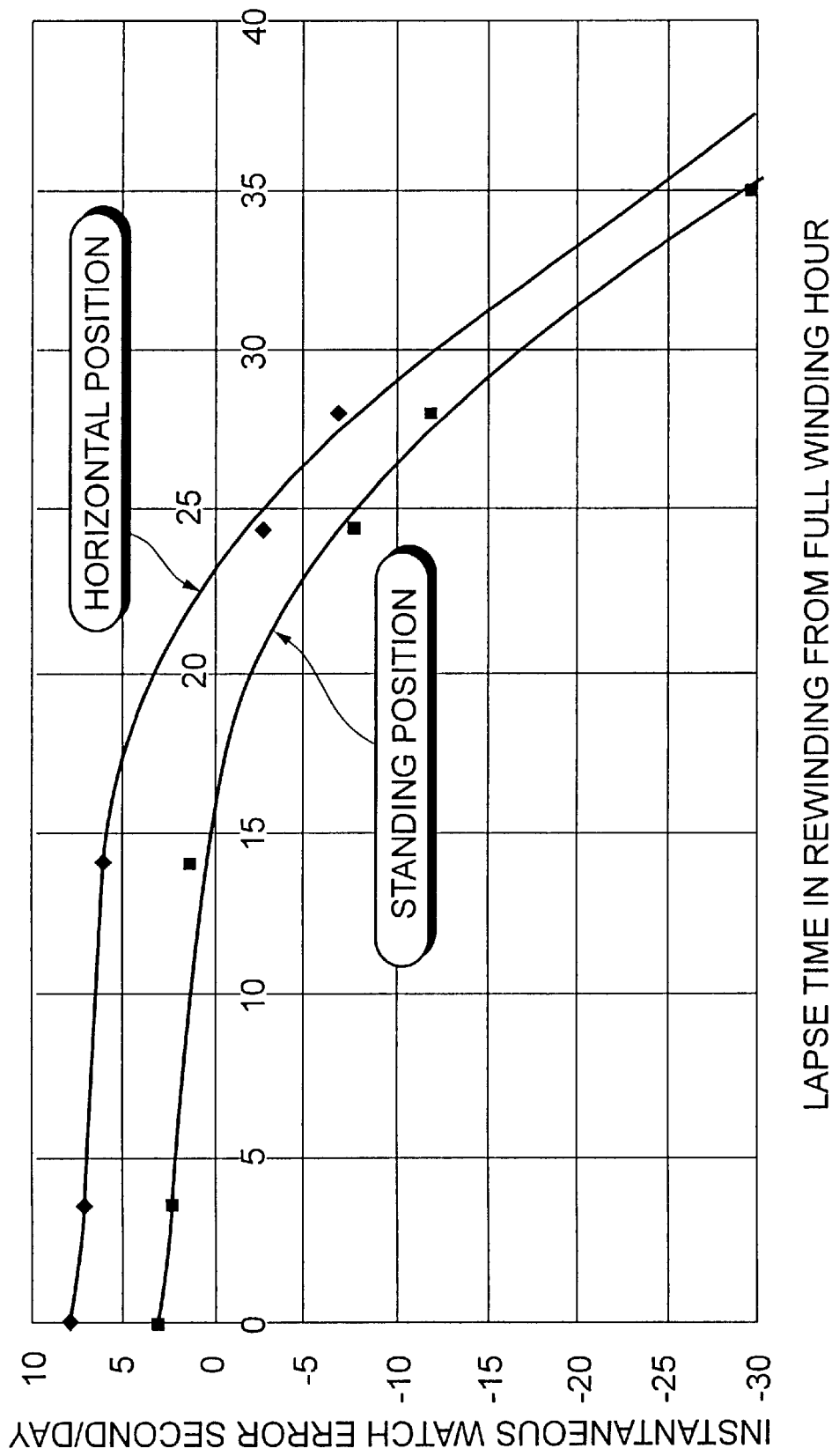
FIG. 33 is a graph schematically showing the relation between an instantaneous watch error (in a horizontal attitude and a vertical attitude) and an elapsed time from a fully wound state of the spring in a mechanical watch.

FIG. 29 shows a representative block diagram showing a configuration of a circuit for detecting the attitude of equipment having the second embodiment of the attitude detection device of the invention.

Referring to FIG. 29, the electrodes A11–A64 are connected through individual lead wires (not shown) to a signal input unit 591.

The signal input unit 592 checks which of these electrodes A11–A64 are electrically connected to each other.

An attitude state memory unit 592 stores information on the relation between the conduction states of the electrodes A11–A61 and the attitudes taken by the attitude detection device.

The attitude check unit 592 receives a signal output from the signal input unit 591 and, by using the attitude information stored in the attitude state memory unit 592, determines the attitude of the attitude detection device.

The attitude checks concern, for example, an angle with respect to the X axis, an angle with respect to the Y axis, and an angle with respect to the Z axis.

Examples of attitude check results are whether the angle with respect to the X axis is larger or smaller than a reference value, whether the angle with respect to the Y axis is larger or smaller than a reference value, and whether the angle with respect to the Z axis is larger or smaller than a reference value.

An attitude check result output unit 594 receives a signal from the attitude check unit 592 and outputs a signal representing the attitude of the attitude detection device.

An output unit 595 displays the attitude of the attitude detection device or outputs a signal for controlling the equipment according to the attitude of the attitude detection device.

For example, the output unit 595 is preferably a display, a printer or a light emitting device.

It is also possible to correct the attitude of the equipment having the attitude detection device according to the signal from the output unit 595 which is intended to be used to control the equipment based on the attitude of the attitude detection device.

The circuit shown in FIG. 29 can also be applied to the first embodiment of the attitude detection device of the invention.

Figure 18:
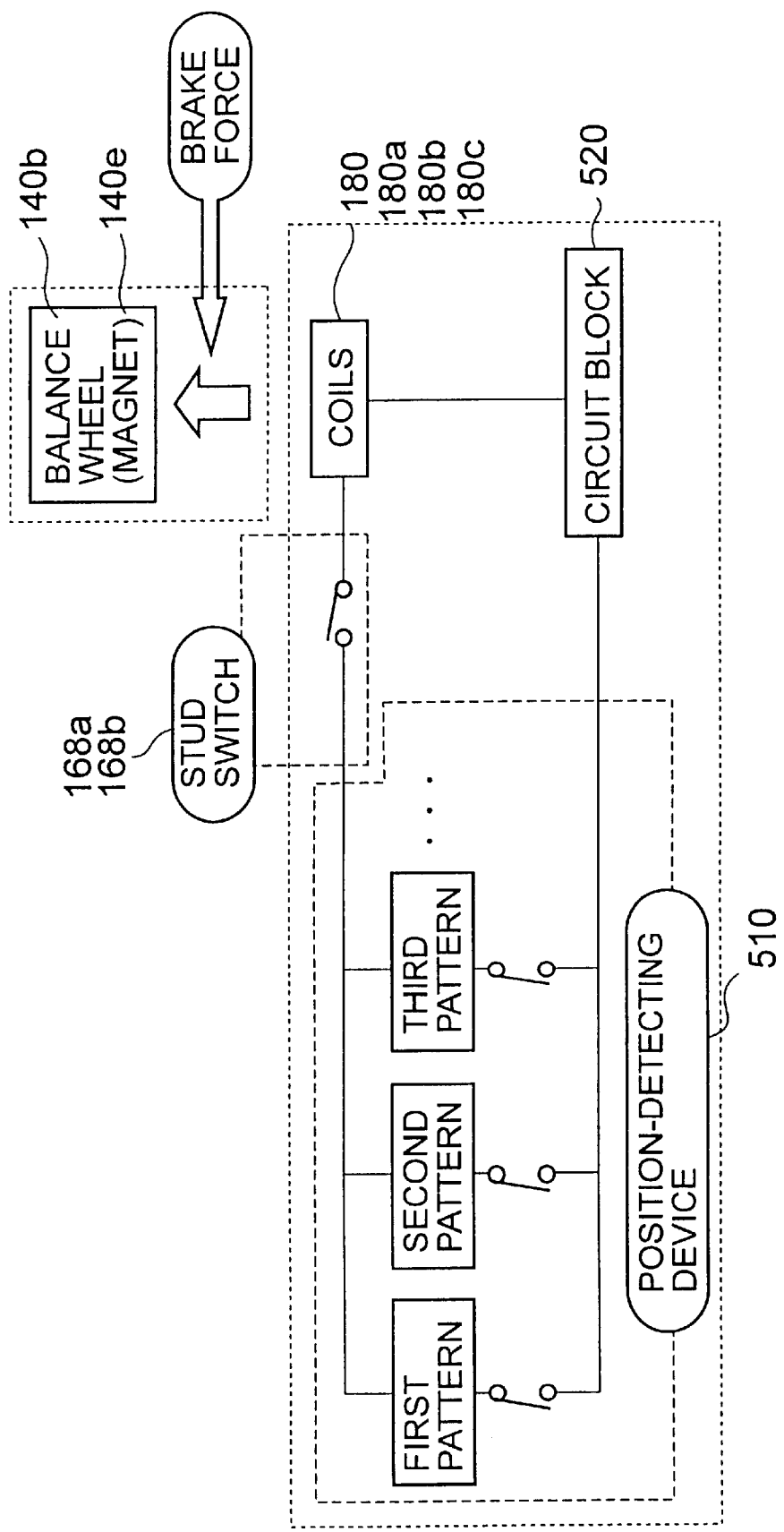
FIG. 18 is a block diagram showing the operation of the attitude detection device in the mechanical watch having the attitude detection device of the invention.

(7) Operation of Balance when Coils Are Not Conducting in Mechanical Watch Having Attitude Detection Device of the Invention Referring to FIGS. 3, 4 and 18, in the mechanical watch having the attitude detection device of the invention, the operation of the balance 140 when the coils 180, 180a, 180b, 180c are not electrically connected, i.e., when the circuit is open, will be explained.

The hairspring 140c expands or contracts in its radial direction according to the rotation angle of the balance 140. In the state of FIG. 3, for example, when the balance 140 rotates clockwise, the hairspring 140c contracts toward the center of the balance 140. When on the other hand the balance 140 rotates counterclockwise, the hairspring 140c expands away from the center of the balance 140.

Hence, in FIG. 4 when the balance 140 rotates clockwise, the hairspring 140c approaches the second contact member 168b. When the balance 140 rotates counterclockwise, the hairspring 140c approaches the first contact member 168a.

When the rotation angle (deflection angle) of the balance 140 is less than a predetermined threshold value, e.g., 180 degrees, the amount of radial contraction or expansion of the hairspring 140c is small, so that the hairspring 140c does not contact the first contact member 168a or the second contact member 168b.

When the rotation angle (deflection angle) of the balance 140 is in excess of the predetermined threshold value, e.g., 180 degrees, the amount of radial contraction or expansion of the hairspring 140c becomes large enough so that the hairspring 140c contacts both of the first contact member 168a and the second contact member 168b.

For example, a portion 140ct of the hairspring 140c near its outer end is situated in a gap of about 0.04 mm between the first contact member 168a and the second contact member 168b. Hence, when the deflection angle of the balance 140 is more than 0 degree and less than 180 degrees, the portion 140ct of the hairspring 140c near its outer end does not contact the first contact member 168a or the second contact member 168b. That is, because the external end portion of the hairspring 140c does not contact the first contact member 168a or the second contact member 168b, the coils 180, 180a, 180b, 180c do not conduct, so that the magnetic flux of the balance magnet 140e does not affect the coils 180, 180a, 180b, 180c. As a result, the deflection angle of the balance 140 is not attenuated by the balance magnet 140e and the coils 180, 180a, 180b, 180c.

Figure 16:
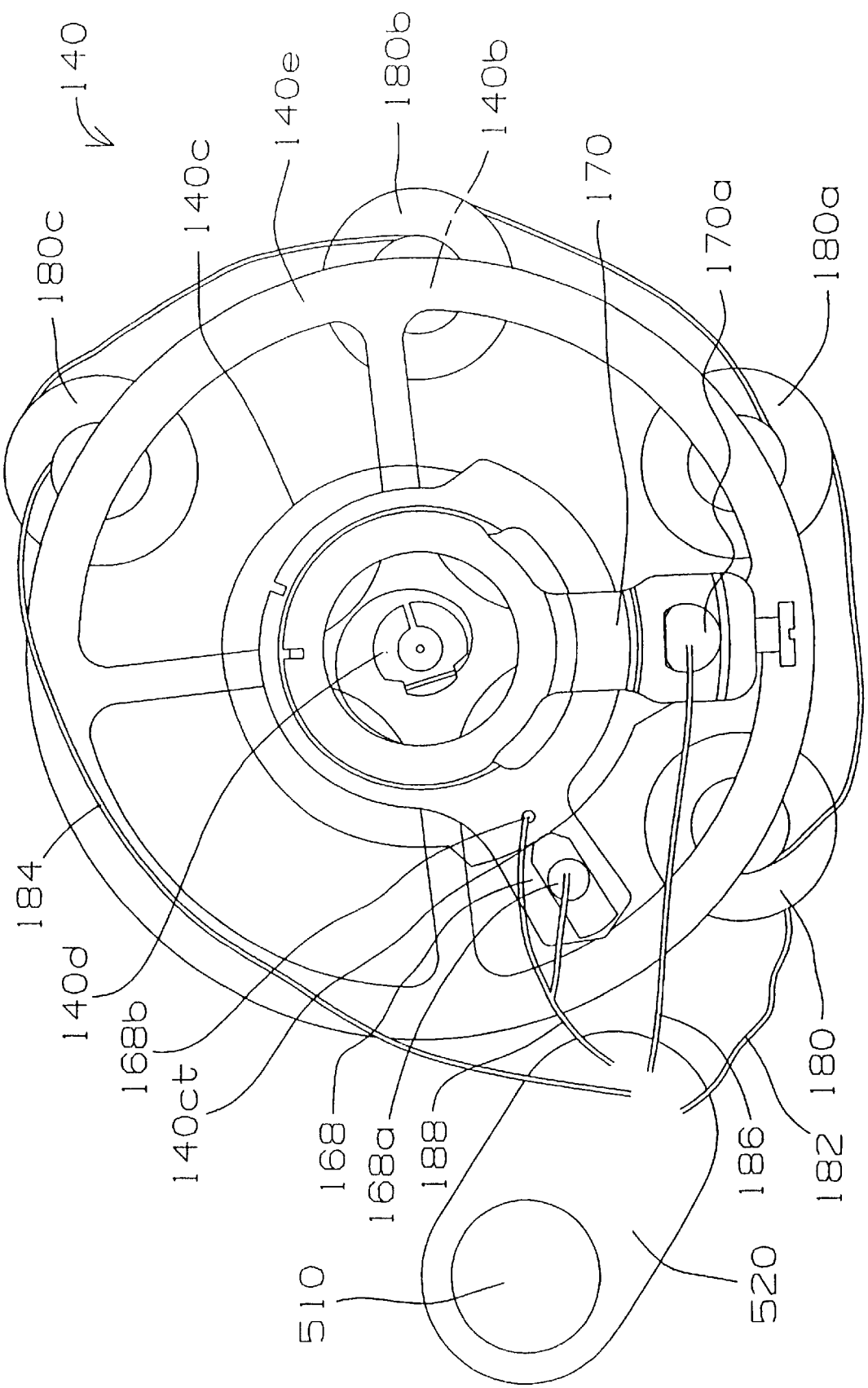
FIG. 16 is an enlarged partial plan view showing an outline construction of a balance in the mechanical watch having the attitude detection device of the invention when a switch mechanism is in an on state.
Figure 17:
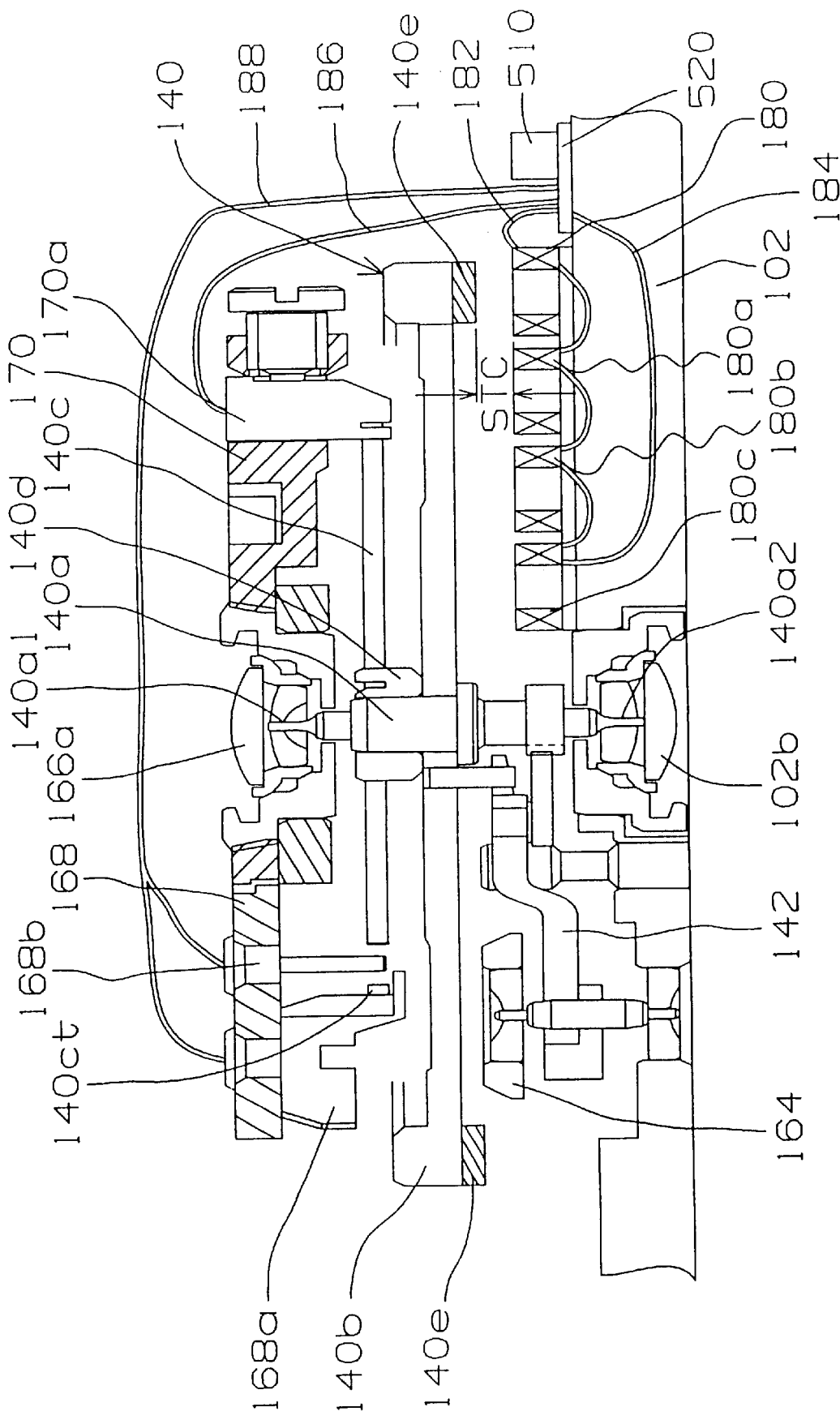
FIG. 17 is an enlarged partial cross section showing an outline construction of a balance in the mechanical watch having the attitude detection device of the invention when a switch mechanism is in an on state.

(8) Operation of Balance when Coils Are Conducting in Mechanical Watch Having Attitude Detection Device of the Invention Next, in the mechanical watch having the attitude detection device of the invention, the operation of the balance 140 when the coils 180, 180a, 180b, 180c are electrically connected, i.e., when the circuit is closed, will be explained by referring to FIGS. 16, 17 and 18. FIGS. 16 and 17 show a case in which the deflection angle of the balance 140 is 180 degrees or more.

In FIG. 17 the thickness of the hairspring 140c (thickness in the radial direction of the balance) is shown exaggerated.

When the deflection angle of the balance 140 exceeds 180 degrees, the portion 140ct of the hairspring 140c near its outer end contacts the first contact member 168a or the second contact member 168b. In this state, the coils 180, 180a, 180b, 180c conduct, allowing a current induced by a change in the magnetic flux of the balance magnet 140e to exert a rotation restraining force on the balance 140. This applies a braking force to the balance 140 to restrain the rotation of the balance 140 and thereby reduce its deflection angle.

Then, when the deflection angle of the balance 140 decreases to a range between 0 and 180 degrees, the portion 140ct of the hairspring 140c near its outer end no longer contacts the first contact member 168a or the second contact member 168b. Hence, as shown in FIGS. 3 and 4, because the outer end portion of the hairspring 140c does not contact the first contact member 168a or the second contact member 168b, the coils 180, 180a, 180b, 180c do not conduct, with the result that the flux of the balance magnet 140e no longer influences the coils 180, 180a, 180b, 180c.

When the coils 180, 180a, 180b, 180c are connected together, i.e., the circuit is closed, and when the mechanical watch with the attitude detection device of the invention is in the "horizontal attitude", the resistance R1 is connected in series with the four coils 180, 180a, 180b, 180c. In other words, the coils 180, 180a, 180b, 180c and the resistance R1 are conducting. A current induced by a change in the magnetic flux of the balance magnet 140e exerts a rotation restraining force on the balance 140. That is, a braking force of a magnitude corresponding to the resistance value of Rref (ohm) is applied to the balance 140 to restrain its rotation and reduce its deflection angle.

When the coils 180, 180a, 180b, 180c are conducting, i.e., the circuit is closed, and the mechanical watch with the attitude detection device of the invention is not in the "horizontal attitude" or "inverted horizontal attitude" or "vertical attitude", then the resistance R3 is connected in series with the four coils 180, 180a, 180b, 180c. The value of the resistance R3 at this time is 1.83 times the reference value Rref (ohm) (i.e., 1.83×Rref).

In this state, the coils 180, 180a, 180b, 180c and the resistance R3 are conducting. A current induced by a change in the magnetic flux of the balance magnet 140e exerts a rotation restraining force on the balance 140. That is, a braking force of a magnitude corresponding to the resistance value of 1.83×Rref (ohm) is applied to the balance 140 to restrain its rotation and reduce its deflection angle.

By setting the resistance value in this way, the braking force applied when the mechanical watch with the attitude detection device of the invention is neither in the "vertical attitude" nor "horizontal attitude," nor "inverted horizontal attitude" is made smaller than a braking force applied when the mechanical watch is in the "horizontal attitude" or "inverted horizontal attitude". Further, the braking force applied when the mechanical watch with the attitude detection device of the invention is neither in the "vertical attitude" nor "horizontal attitude" nor "inverted horizontal attitude" is made larger than a braking force applied when the mechanical watch is in the "vertical attitude".

When the coils 180, 180a, 180b, 180c are conducting, i.e., the circuit is closed, and the mechanical watch with the attitude detection device of the invention is in the "vertical attitude", the resistance R2 is connected in series with the four coils 180, 180a, 180b, 180c. The value of the resistance R2 is 3.48 times the reference value Rref (ohm) (i.e., 3.48×Rref).

In this state, the coils 180, 180a, 180b, 180c and the resistance R2 are conducting. A current induced by a change in the magnetic flux of the balance magnet 140e exerts a rotation restraining force on the balance 140. That is, a braking force of a magnitude corresponding to the resistance value of 3.48×Rref (ohm) is applied to the balance 140 to restrain its rotation and reduce its deflection angle.

By setting the resistance value in this way, the braking force applied when the mechanical watch with the attitude detection device of the invention is in the "vertical attitude" is made smaller than a braking force applied when the mechanical watch is in the "inverse horizontal attitude".

In the mechanical watch having the attitude detection device of this invention with the above configuration, it is possible to control the rotation angle of the balance 140 very accurately according to the attitude taken by the mechanical watch.

As described above, in the mechanical watch in which an escapement/governor includes a balance repeating left and right rotations, an escape wheel rotating according to the rotation of the front train, and a pallet controlling the rotation of the escape wheel according to the operation of the balance, the use of the attitude detection device of the invention allows the rotation angle of the balance to be controlled according to various attitudes taken by the mechanical watch. Hence, it is possible to improve the accuracy of the mechanical watch without reducing the operating time.

That is, in the mechanical watch with the attitude detection device of the invention, attention is focused on the correlation between the instantaneous watch error and the deflection angle to control the rotation angle of the balance according to various attitudes of the mechanical watch to keep the deflection angle constant, thereby suppressing variations in the instantaneous watch error to reduce the amount gained or lost by the watch per day.

In the conventional mechanical watch without the attitude detection device, the deflection angle changes with the elapse of time according to the relation between the operating time and the deflection angle. Further, according to the relation between the deflection angle and the instantaneous watch error, the instantaneous watch error changes with the elapse of time. In addition, the instantaneous watch error also change with the elapse of time according to the relation between the attitude of the mechanical watch and the instantaneous watch error.

Therefore, in the conventional mechanical watch without the attitude detection device, it is difficult to extend the operating time of the mechanical watch during which a predetermined precision can be maintained.

(9) Simulation of Instantaneous Watch Error in Mechanical Watch Having Attitude Detection Device of the Invention Next, let us explain about the result of simulation regarding the instantaneous watch error conducted on the mechanical watch with the attitude detection device of this invention developed to solve the problems experienced with the conventional mechanical watch without the attitude detection device.

Referring to FIG. 27, in the mechanical watch with the attitude detection device of the invention, the instantaneous watch error of the mechanical watch is first adjusted to a fast state, as indicated by markings x and a thin line in FIG. 27. In the mechanical watch with the attitude detection device of the invention, when the balance 140 rotates a predetermined angle or more, the outer end portion of the hairspring 140c comes into contact with the first contact member 168a or the second contact member 168b, at which time the effective length of the hairspring 140c is reduced, further advancing the instantaneous watch error.

That is, in the mechanical watch with the attitude detection device of the invention, when the outer end portion of the hairspring 140c is out of contact with the first contact member 168a and the second contact member 168b, the watch error is approximately 18 seconds/day (the watch gains about 18 seconds a day) as indicated by markings x and a thin line in FIG. 27 when the mainspring is fully wound. The instantaneous watch error decreases to about 13 seconds/day (the watch gains about 13 seconds a day) 20 hours after the mainspring is fully wound, and further down to about −2 seconds/day (it loses about 2 seconds a day) 30 hours from the fully wound state.

In this mechanical watch with the attitude detection device of the invention, if it is assumed that the balance rotation angle control mechanism is not operated, when the outer end portion of the hairspring 140c is in contact with the first contact member 168a or the second contact member 168b, the watch error with the mainspring fully wound is about 18 seconds/day (the watch gains about 18 seconds a day). The instantaneous watch error decreases to about 13 seconds/day (the watch gains 13 seconds a day) 20 hours after the mainspring is fully wound. The instantaneous watch error further decreases to about −2 seconds/day (the watch loses about 2 seconds a day) 30 hours from the fully wound state.

On the other hand, in the mechanical watch with the attitude detection device of the invention, if the balance rotation angle control mechanism is operated, the instantaneous watch error can be maintained at about 5 seconds/day (the watch maintains a state in which it gains about 5 seconds a day) while the balance rotation angle control mechanism is in operation, i.e., from the time the mainspring is fully wound until the operating time passes 27 hours, as indicated by black circle markings and a thick line in FIG. 27. The instantaneous watch error decreases to about −2 seconds/day (the watch loses about 2 seconds a day) 30 hours from the fully wound state.

Further, the mechanical watch with the attitude detection device of this invention is constructed to control the balance rotation angle according to various attitudes of the mechanical watch. Hence, the deflection angle can be kept almost constant in whatever attitude the mechanical watch may take.

As a result, in the mechanical watch with the attitude detection device of the invention, the characteristic indicated by the black circle markings and the thick line in FIG. 27 can be maintained in any attitude of the mechanical watch.

With this invention, a small, highly precise attitude detection device can be realized.

Therefore, the mechanical watch with the attitude detection device of the invention allows the deflection angle of the balance to be controlled very effectively in whatever attitude the mechanical watch may take. Hence, the mechanical watch with the attitude detection device of the invention can suppress a change in the instantaneous watch error. Thus, the operating time from the fully wound state during which the instantaneous watch error is about 0–5 seconds/day can be extended, when compared with the conventional mechanical watch without the attitude detection device of this invention which is indicated by black square markings and a thick line.

That is, the mechanical watch with the attitude detection device of the invention has approximately 32 hours of operating time with the instantaneous watch error of less than about ±5 seconds/day. This operating time is about 1.45 times the operating time of about 22 hours in which the instantaneous watch error of the conventional mechanical watch without the attitude detection device of this invention is within ±5 seconds/day.

The result of the above simulation therefore has found that the mechanical watch with the attitude detection device of this invention has a very high precision compared with the conventional mechanical watch.

INDUSTRIAL APPLICABILITY

The attitude detection device of this invention is small and highly accurate.

Thus, the attitude detection device of the invention is suited for realizing a mechanical watch that is simple in construction and has a very high precision.

Further, because the attitude detection device of this invention is small and highly accurate, it can be used on machine tools, measuring devices, video equipment and recording equipment.

What is claimed is:

1. An attitude detection device comprising: a case having a hexahedral shape defining a plurality of inner surfaces; a plurality of electrodes each disposed on a respective inner surface of the case and being insulated from one another in at least one preselected orientation of the case; and a conductive fluid disposed in the case so that in a first orientation of the case the conductive fluid electrically connects all but one of the electrodes to generate a first electrical pattern for outputting a first output signal, in a second orientation of the case the conductive fluid electrically connects all but three of the electrodes to generate a second electrical pattern for outputting a second output signal, and in a third orientation of the case different from the first and second orientations a third electrical pattern is generated for outputting a third output signal.

2. An attitude detection device comprising: a case having a hexahedral shape defining a plurality of inner surfaces; a plurality of electrodes disposed on each of the inner surfaces of the case so that the electrodes on each of the inner surfaces are insulated from the electrodes on each of the other inner surfaces in at least one preselected orientation of the case; and a conductive fluid disposed in the case so that in each of three positional orientations of the case the conductive fluid electrically connects a different number of the electrodes to obtain three correspondingly different conduction states each for outputting an output signal.

3. An attitude detection device according to claim 1; wherein the case is generally cubic-shaped.

4. An attitude detection device according to claim 3; wherein the case is made of an insulating material.

5. An attitude detection device according to claim 1; wherein the case is generally rectangular parallelepiped-shaped.

6. An attitude detection device according to claim 5; wherein the case is made of an insulating material.

7. An attitude detection device according to claim 1; wherein the case is made of an insulating material.

8. An attitude detection device according to claim 2; wherein the case is generally cubic-shaped.

9. An attitude detection device according to claim 8; wherein the case is made of an insulating material.

10. An attitude detection device according to claim 2; wherein the case is generally rectangular parallelepiped-shaped.

11. An attitude detection device according to claim 10; wherein the case is made of an insulating material.

12. An attitude detection device according to claim 2; wherein the case is made of an insulating material.

13. An attitude detection device comprising: a case made of an insulating material and having a plurality of inner surfaces; at least one electrode disposed on each of the inner surfaces of the case so that the electrode on each of the inner surfaces is insulated from the electrodes on the other inner surfaces; and a conductive fluid disposed in the case for selectively electrically connecting a preselected number of the electrodes disposed on different inner surfaces of the case to generate an electrical pattern for outputting an output signal, the type of electrical pattern generated and the corresponding output signal being dependent upon the preselected number of electrodes being electrically connected by the conductive fluid.

14. An attitude detection device according to claim 13; wherein the case has a hexahedral shape.

15. An attitude detection device according to claim 14; wherein the case is generally cubic-shaped.

16. An attitude detection device according to claim 14; wherein the case is generally rectangular parallelepiped-shaped.

17. An attitude detection device according to claim 13; wherein the at least one electrode comprises a plurality of electrodes.

* * * * *